United States Patent
Furui

(10) Patent No.: US 9,122,138 B2
(45) Date of Patent: Sep. 1, 2015

(54) PROJECTOR, IMAGE DISPLAY SYSTEM, AND PROJECTOR CONTROL METHOD

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 143 days.

(21) Appl. No.: 13/913,944

(22) Filed: Jun. 10, 2013

(65) Prior Publication Data

US 2013/0342816 A1     Dec. 26, 2013

(30) Foreign Application Priority Data

Jun. 22, 2012   (JP) ................................ 2012-141294

(51) Int. Cl.
  G03B 21/26    (2006.01)
  G03B 21/14    (2006.01)
  H04N 9/31     (2006.01)

(52) U.S. Cl.
  CPC ............ *G03B 21/147* (2013.01); *H04N 9/3147* (2013.01); *H04N 9/3185* (2013.01); *H04N 9/3194* (2013.01)

(58) Field of Classification Search
  CPC . H04N 9/3147; H04N 9/3185; H04N 9/3194; H04N 9/3197
  USPC .................. 353/48, 69, 70, 94; 348/743–747; 349/5, 7–9
  See application file for complete search history.

(56) References Cited

U.S. PATENT DOCUMENTS

| 7,889,952 B2 * | 2/2011 | Miyazawa ..................... 382/304 |
| 8,272,746 B2 * | 9/2012 | Furui .............................. 353/69 |
| 8,439,508 B2 * | 5/2013 | Matsuo et al. ................ 353/119 |
| 2002/0021418 A1 * | 2/2002 | Raskar ............................. 353/69 |
| 2004/0227908 A1 * | 11/2004 | Wada et al. ..................... 353/94 |
| 2008/0100806 A1 * | 5/2008 | Inazumi .......................... 353/31 |
| 2010/0141852 A1 * | 6/2010 | Jurik et al. .................... 348/745 |

FOREIGN PATENT DOCUMENTS

JP        B2-4168024       10/2008

* cited by examiner

*Primary Examiner* — Sultan Chowdhury
(74) *Attorney, Agent, or Firm* — Oliff PLC

(57) ABSTRACT

A second projector projects and displays a measurement pattern on a projection screen while a first projector projects and displays another measurement pattern on the projection screen. The second projector causes an imaging unit to acquire a captured image including projection images of the two measurement patterns are captured, and detects coordinates of measurement points which are represented in the measurement patterns from the captured image. The second projector corrects the projection target image based on the coordinates such that the projection image by the first projector and its own projection image are in a desired relationship.

13 Claims, 21 Drawing Sheets

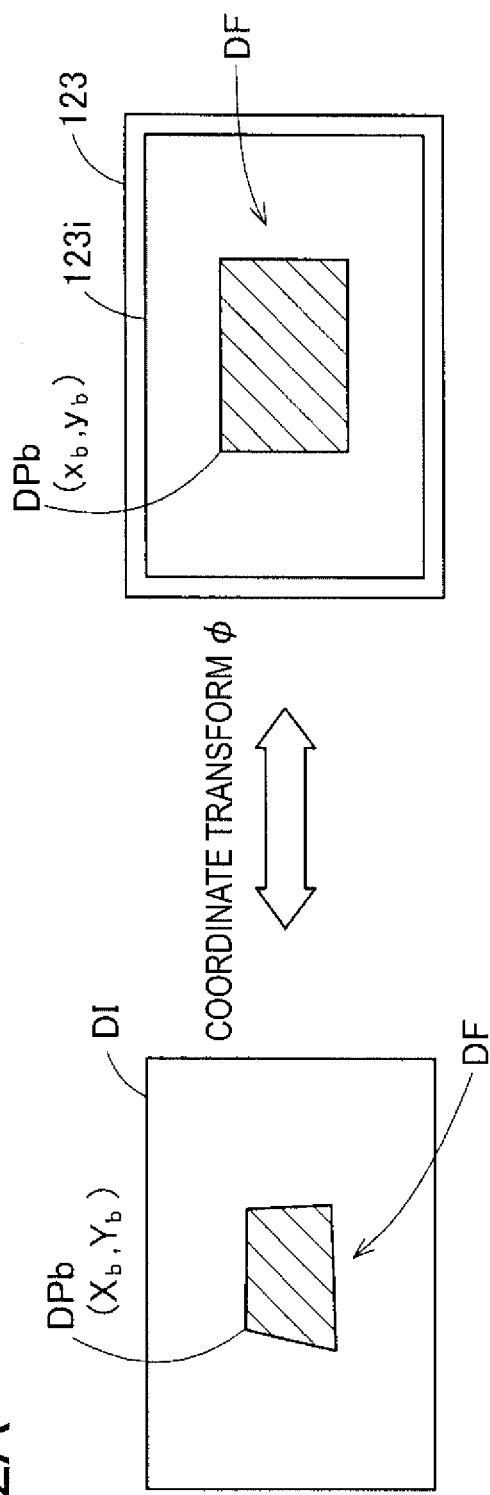
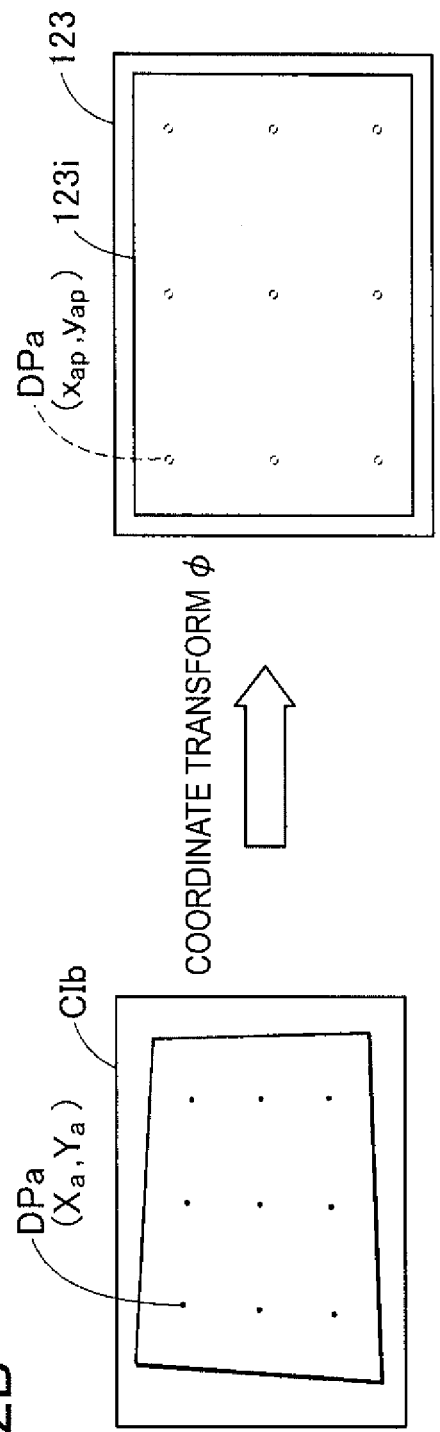

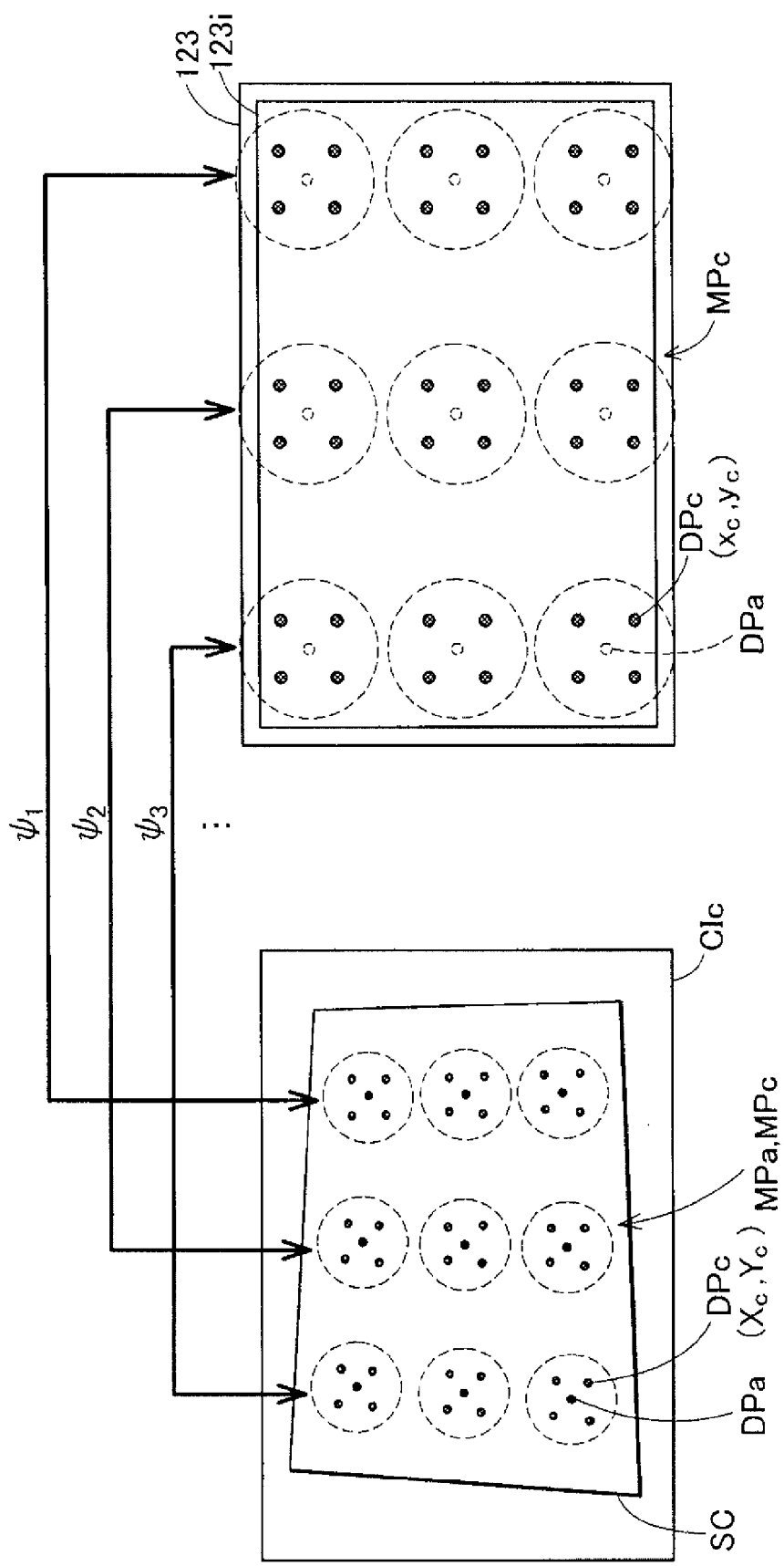

PROJECTOR, IMAGE DISPLAY SYSTEM, AND PROJECTOR CONTROL METHOD

The entire disclosure of Japanese Patent Application No. 2012-141294, filed Jun. 22, 2012 is expressly incorporated by reference herein.

BACKGROUND

1. Technical Field

The present invention relates to a projector.

2. Related Art

A so-called stack projection technique in which a projection image is formed by overlapping projection images of a plurality of projectors on a common screen has been known. The stack projection is used for forming a three-dimensional image by a plurality of projectors or for forming a projection image with high luminance, for example. In the stack projection, it is necessary to overlap the plurality of projection images with high precision in order to enhance the quality of the formed projection image.

In response to such a request, the stack projection is executed by performing the following correction processing in a technique disclosed in Japanese Patent No. 4168024, for example. According to the technique disclosed in Japanese Patent No. 4168024, a control apparatus controls two projectors to alternately project coordinate pattern images and controls a common measurement camera to capture projection images of the respective coordinate pattern images. The control apparatus executes processing for calculating correction data of the respective projectors by using the captured images.

Here, in the technique disclosed in Japanese Patent No. 4168024, the control apparatus is required to control the respective projectors to cooperate in order to cause the respective projectors to display the coordinate pattern images. In addition, there is a possibility that the number of processes and processing time for the correction significantly increase since the correction is performed for each projector. As described above, there is a possibility that a system configuration and system control become complicated and increase in size and processing efficiency is degraded in the technology disclosed in Japanese Patent No. 4168024.

Incidentally, a positional relationship among projectors changes over time, and there is a problem that degradation of image quality is incurred in an image display system which performs image display processing for combining a plurality of projection images, such as the stack projection. Therefore, it is necessary to simply and quickly execute adjustment and correction processing to achieve a desired relationship among the projection images, namely so-called stack correction for correcting deviation of the projection images on the image display system which performs such image display processing and the projectors which configure the system are required.

In addition, downsizing and general use of the configuration, cost reduction, resource saving, facilitation of fabrication, enhanced convenience (usability), and the like have been required for the image display system which forms an image by combining a plurality of projection images and the projector as movie media using three-dimensional images have been widely distributed and movie media have been diversified.

SUMMARY

An advantage of some aspects of the invention is to solve at least a part of the problems described above, and the invention can be implemented as the following forms.

(1) An aspect of the invention provides a projector. The projector includes: a projection unit which projects a projection image of a projection target image on a projection surface; a projection control unit which causes the projection unit to project a second image when a first image is projected on the projection surface by another projector, the first image including a first pattern which represents positions of a plurality of measurement points, the second image including a second pattern which represents positions of a plurality of measurement points and is different from the first pattern; an imaging unit which images the projection surface and creates a captured image; an image analysis unit which detects the first and second patterns from the captured image which is acquired from the imaging unit; and a correction processing unit which corrects the projection target image such that the projection image projected by the projection unit and the projection image projected by the other projector are in a desired relationship based on a detection result of the image analysis unit. According to the projector with such a configuration, it is possible to easily make an adjustment based on the first pattern which is projected and displayed by the other projector such that the projection image of the other projector and its own projection image are in a desired relationship.

(2) The projector of the aspect of the invention may be configured such that the correction processing unit derives a first correspondence relationship between a coordinate system of the captured image and a coordinate system of the projection target image based on coordinates of the plurality of measurement points which are represented by the second pattern in the captured image and coordinates of the plurality of measurement points which are represented by the second pattern in the second image, and corrects the projection target image based on the first relationship such that the projection image projected by the projection unit and the projection image projected by the other projector are in a desired relationship. According to the projector with such a configuration, it is possible to more precisely make an adjustment such that its own projection image and the projection image of the other projector are in a desired relationship since the correction is performed after the correction processing unit associates the coordinate system of the captured image and the coordinate system of the projection target image.

(3) The projector of the aspect of the invention may be configured such that the correction processing unit derives coordinates in the coordinate system of the projection target image corresponding to coordinates of the plurality of measurement points which are represented by the first pattern in the captured image based on the first correspondence relationship. According to the projector with such a configuration, the correction processing unit can derive the coordinate system of the projection image of the other projector based on the first correspondence relationship. Therefore, it is possible to perform correction such that the coordinate system of its own projection image matches the coordinate system of the projection image of the other projector.

(4) The projector of the aspect of the invention may be configured such that the first pattern represents at least one measurement point for each of a plurality of divided areas which are formed by dividing the first image, and the second pattern represents at least two or more measurement points for each of the plurality of divided areas in the first image.

According to the projector with such a configuration, the correction processing unit can perform more precise correction since it is possible to more precisely derive the first correspondence relationship.

(5) The projector of the aspect of the invention may be configured such that the correction processing unit derives the first correspondence relationship for each of the plurality of divided areas based on the coordinates of the plurality of measurement points which are represented by the second pattern. According to the projector with such a configuration, it is possible to derive the first correspondence relationship for each divided area and to thereby more precisely perform the correction.

(6) The projector of the aspect of the invention may be configured such that the projector further includes a pattern image creating unit which creates the second image based on the captured image including a projection image of the first image. According to the projector with such a configuration, it is possible to perform the correction processing by projecting an appropriate second pattern on the projection surface in accordance with the projection image of the first pattern and to thereby enhance precision of the correction.

(7) The projector of the aspect of the invention may be configured such that the projection control unit causes the projection unit to project a third image when the first image is projected on the projection surface by the other projector, the third image including a third pattern which represents positions of a plurality of less measurement points than the plurality of measurement points in the second image and is different from the first pattern, the imaging unit images the projection surface on which the first and third images are projected, the image analysis unit respectively detects the first and third patterns from the captured image which includes projection images of the first and third images, the pattern image creating unit derives a second correspondence relationship between a coordinate system of the projection image by the projection unit in the captured image and a coordinate system of the projection target image based on the coordinates of the plurality of measurement points which are represented by the third patterns on the captured image and the coordinates of the plurality of measurement points which are represented by the third pattern in the third image, and forms the second pattern in the second image based on the second correspondence relationship and the coordinates of the plurality of measurement points which are represented by the first pattern in the captured image such that a plurality of measurement points are aligned around each of the plurality of measurement points which are represented by the first pattern on the projection surface. According to the projector with such a configuration, it is possible to avoid the measurement points of the first image which is projected and displayed by the other projector being overlapped with the measurement points of the second image on the projection surface and to thereby enhance detection precision of the measurement points which are represented by the projected and displayed second patterns and enhance precision of the correction.

(8) The projector of the aspect of the invention may be configured such that the second pattern represents positions of the plurality of measurement points which are dispersed and aligned over the entire second image, and the correction processing unit extracts measurement points which are present within a predetermined range from respective centers of the plurality of measurement points which are represented by the first pattern among the plurality of measurement points which are represented by the second pattern on the projection surface, and uses the measurement points for deriving the first correspondence relationship. According to the projector with such a configuration, it is possible to perform the correction by using the measurement points which are represented by the second pattern and are present around the measurement points represented by the first pattern and to thereby enhance precision of the correction.

(9) The projector of the aspect of the invention may be configured such that the correction processing unit corrects the projection target image such that the projection image projected by the projection unit is substantially superimposed with the projection image which is projected by the other projector. According to the projector with such a configuration, it is possible to enhance quality of a stack projection image which is formed on the projection surface in cooperation with the other projector.

(10) The projector of the aspect of the invention may be configured such that the correction processing unit corrects the projection target image such that the projection image which is projected by the projection unit is partially superimposed with the projection image which is projected by the other projector. According to the projector with such a configuration, it is possible to enhance quality of a tiling image which is formed by aligning a plurality of projection images on the projection surface in cooperation with the other projector.

(11) Another aspect of the invention is directed to an image display system which is provided with first and second projectors and causes the first and second projectors to cooperate to form a projection image on a common projection surface. In the image display system, the first projector includes: a first projection unit which projects a projection image of a projection target image on the projection surface; and a first projection control unit which causes the first projection unit to project a first image on the projection surface, the first image including a first pattern which represents positions of a plurality of measurement points, the second projector includes: a second projection unit which projects a projection image of a projection target image on the projection surface; a second projection control unit which causes the second projection unit to project a second image when the first image is projected on the projection surface by the first projector, the second image including a second pattern which represents positions of a plurality of measurement points and is different from the first pattern; an imaging unit which images the projection surface and creates a captured image; an image analysis unit which respectively detects the first and second patterns from the captured image which is acquired from the imaging unit; and a correction processing unit which corrects the projection target image such that a projection image which is projected by the second projection unit and a projection image which is projected by the first projection unit are in a desired relationship based on a detection result of the image analysis unit. According to the image display system with such a configuration, it is possible to easily make an adjustment based on the first pattern which is projected and displayed by the first projector such that the projection image by the first projector and the projection image by the second projector are in a desired relationship.

(12) The image display system of the aspect of the invention may be configured such that the first projection control unit of the first projector continues the projection of the first image until the correction processing unit starts the correction of the projection target image after the second projection control unit of the second projector starts the projection of the second image. According to the image display system with such a configuration, the second projector executes the correction while the first projector merely continues the projection of the first pattern. Accordingly, it is possible to execute correction for adjusting the relationships of a plurality of projection images such as stack correction.

(13) Still another aspect of the invention is directed to a control method of a projector which creates a projection image on a projection surface in corporation with another projector. The control method includes: (a) projecting a second image on a projection surface when a first image is projected on the projection surface by another projector, the first image including a first pattern which represents positions of a plurality of measurement points, the second image including a second pattern which represents positions of a plurality of measurement points and is different from the first pattern; (b) imaging the projection surface, on which the first and second patterns are projected and the displayed; (c) respectively detecting the first and second patterns from a captured image of the projection surface; and (d) correcting the projection target image based on a detection result of the first and second patterns such that a projection image which is projected by the projector and an image which is projected by the other projector are in a desired relationship. According to such a method, it is possible to easily adjust the relationship between the projection image by the first projector and the projection image of the control target projector based on the first image which is projected and displayed by the other projector.

All of the plurality of constituents included in the aforementioned aspects of the invention are not essential, and a part of the constituents among the plurality of constituents may be appropriately deleted or replaced with other new constituents, or a part of limited content may be deleted in order to partially or entirely solve the aforementioned problems or partially or entirely achieve the effects described in this specification. In addition, it is also possible to combine a part of or the entirety of the technical features included in an aforementioned aspect of the invention with a part of or the entirety of the technical feature included in another aspect of the invention in order to partially or entirely solve the aforementioned problems or partially or entirely achieve the effects described in this specification and regard the combination as an independent aspect of the invention.

For example, an aspect of the invention can be configured as an apparatus which includes at least one of five components among the projection unit, the imaging unit, the projection control unit, the image analysis unit, and the correction processing unit. That is, the apparatus may or may not be provided with the imaging unit. In addition, the apparatus may or may not be provided with the projection control unit. Moreover, the apparatus may or may not be provided with the image analysis unit. Furthermore, the apparatus may or may not be provided with the correction processing unit. For example, the imaging unit may be configured as a projection surface imaging unit which images the projection surface and creates the captured image. The projection control unit may be configured as a pattern image projection control unit which causes the projection unit to project the second image including the second pattern which represents the positions of the plurality of measurement points and is different from the first pattern when the first image including the first pattern which represents the positions of the plurality of measurement points is projected on the projection surface by the other projector. The image analysis unit may be configured as a pattern detection unit which detects the first and second patterns from the captured image, for example. The correction processing unit may be configured as a correction processing unit which derives the first correspondence relationship between the coordinate system of the projection image in the captured image and the coordinate system of the projection target image based on the coordinates of the plurality of measurement points which are represented by the second pattern in the captured image and the coordinate of the plurality of the measurement points which are represented by the second pattern in the second image, and matches the coordinate system of the projection image by the projection unit with the coordinate system of the projection image by the other projector which is derived from the coordinates of the plurality of measurement points represented by the first pattern in the captured image. Although such an apparatus can be realized as a projector, for example, the apparatus can be realized as an apparatus other than the projector. With such a configuration, at least one of various purposes such as downsizing of the apparatus, cost reduction, resource saving, facilitation of fabrication, enhanced usability, and the like can be solved. A part of or all the technical features in the aforementioned aspects of the projector can be applied to the apparatus.

The invention can be implemented in various forms other than the projector, the image display system, and the control method. For example, the invention can be realized in forms of an image correction method in a projector, a control method of an image display system, a computer program which implements the correction method or the control method, or a recording medium which records the computer program in a non-temporal manner.

BRIEF DESCRIPTION OF THE DRAWINGS

The invention will be described with reference to the accompanying drawings, wherein like numbers reference like elements.

FIGS. 12A and 12B are diagrams schematically illustrating a process for acquiring coordinate transform.

FIG. 15 is a diagram schematically illustrating a process for acquiring a coordinate transform.

DESCRIPTION OF EXEMPLARY EMBODIMENTS

A. First Embodiment

Figure 1A:
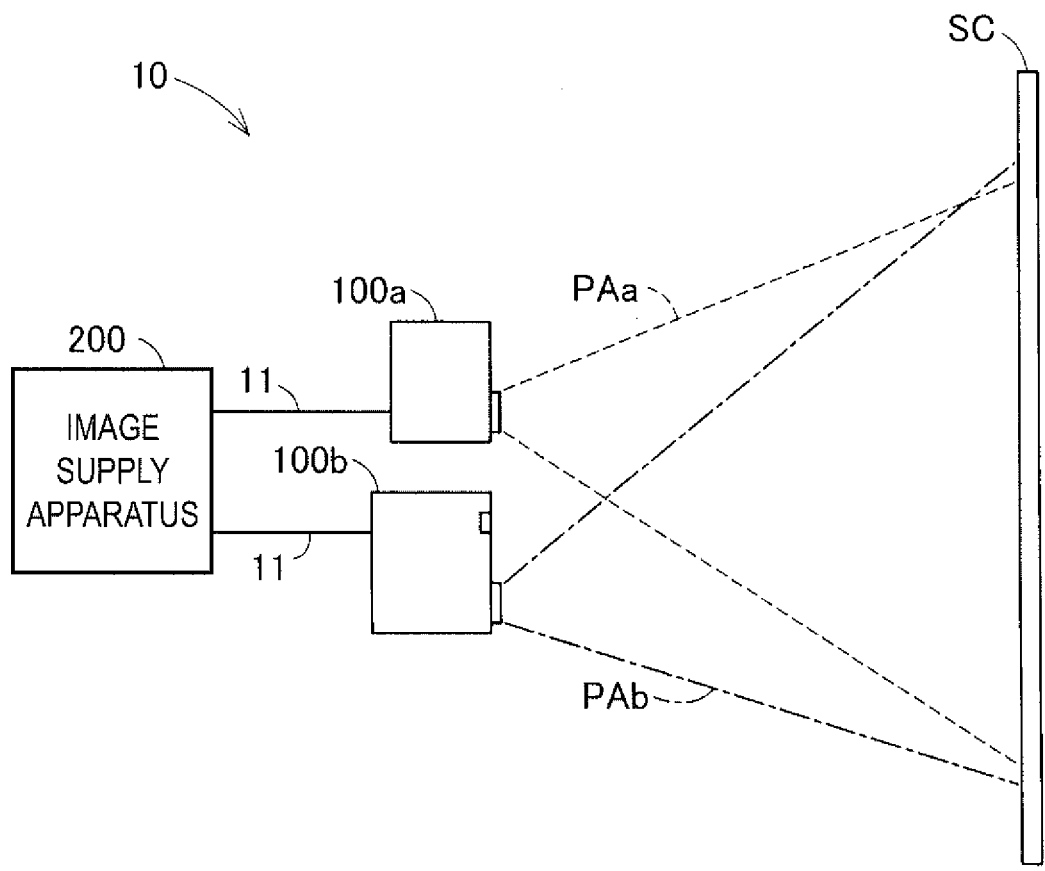
FIGS. 1A and 1B are outlined diagrams showing a configuration of an image display system according to a first embodiment.
Figure 1B:
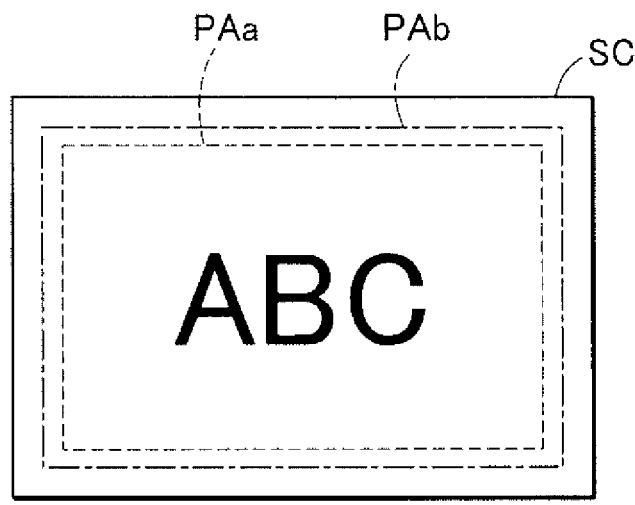

FIG. 1A is an outlined diagram showing a configuration of an image display system 10 according to a first embodiment of the invention. FIG. 1B is a diagram schematically showing a state where a projection image is generated on a projection screen SC by the image display system 10. In FIGS. 1A and 1B, borders of projection areas by first and second projectors 100a and 100b are shown by broken lines and one-dotted chain lines, respectively.

The image display system 10 performs so-called stack projection for forming a projection image by superimposing a plurality of projection images on the projection screen SC. In this specification, the expression of "superimposing images" includes substantially superimposing images, and more specifically, includes superimposing a plurality of images within a range of error from 0 pixels to 10 pixels.

The image display system 10 is provided with the first and second projectors 100a and 100b and an image supply device 200. The first and second projectors 100a and 100b are respectively connected to the image supply device 200 via a signal line 11 and receive image signals for generating projection images from the image supply device 200. The image display device 200 can be configured by a moving image reproduction device such as a personal computer and a DVD player.

The image display system 10 causes the first and second projectors 100a and 100b to cooperate and executes stack projection. The image display system 10 makes an adjustment in the correction processing for causing the second projector 100b to execute stack correction such that the projection images of the first and second projectors 100a and 100b are precisely overlapped, as will be described later in detail. In addition, the adjustment is made such that a projection area PAa of the first projector 100a is located within a projection area PAID of the second projector 100b on the projection screen SC in the stack projection.

Figure 2:
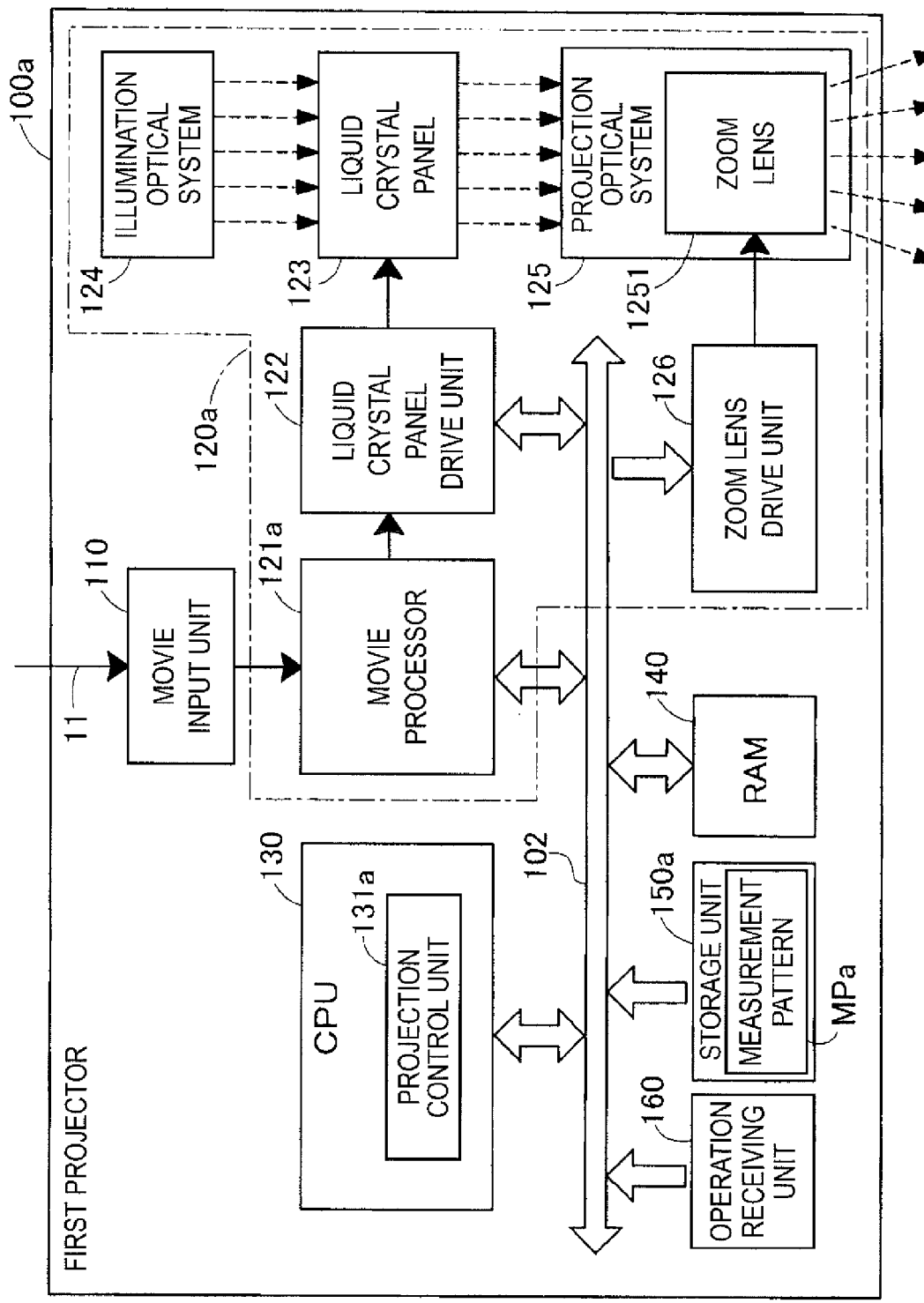
FIG. 2 is an outlined diagram showing an internal configuration of a first projector.

FIG. 2 is an outlined diagram showing an internal configuration of the first projector 100a. The first projector 100a is provided with a movie input unit 110, a projection unit 120a, a central processing unit (CPU) 130, a main storage device (RAM) 140, a storage device 150a, and an operation receiving unit 160.

The movie input unit 110 is connected to the signal line 11, converts a movie signal which is received from the image supply device 200 into a signal which can be processed by the projection unit 120a, and transmits the signal to the projection unit 120a. The movie input unit 110 can be configured by an A/D converting circuit for converting an analog image signal into a digital image signal, for example.

The projection unit 120a is provided with a movie processor 121a, a liquid crystal panel drive unit 122, a liquid crystal panel 123, an illumination optical system 124, a projection optical system 125, and a zoom lens drive unit 126. The movie processor 121a is a processor for processing an image signal. The movie processor 121a performs predetermined correction processing such as keystone correction and color tone correction on the signal acquired from the movie input unit 110 and outputs the signal to the liquid crystal panel drive unit 122.

The liquid crystal panel drive unit 122 is an optical modulator which modulates incident light based on the image signal. The liquid crystal panel drive unit 122 drives the liquid crystal panel 123 based on the image signal acquired from the movie processor 121a and forms an image on a panel surface of the liquid crystal panel 123. The illumination light output from the illumination optical system 124 is modulated into image light, which represents an image, by the image formed on the liquid crystal panel 123.

The image light modulated by the liquid crystal panel 123 is projected to the projection screen SC via the projection optical system 125. In addition, the projection optical system 125 is provided with a zoom lens 1251. A focal point distance of the zoom lens 1251 is adjusted by a motor provided in the zoom lens drive unit 126.

The CPU 130, the movie processor 121a, the liquid crystal panel drive unit 122, the zoom lens drive unit 126, the RAM 140, the storage device 150a, and the operation receiving unit 160 are connected to each other via an internal bus 102. The CPU 130 functions as a projection control unit 131a by reading a predetermined program from the storage device 150a to the RAM 140 and executing the program.

The projection control unit 131a controls the respective components 121a, 122, and 126 of the projection unit 120a which is connected via the internal bus 102 and executes display processing of the projection image. In addition, the projection control unit 131a receives an operation, which is performed by a user on the first projector 100a, via the operation receiving unit 160. The operation receiving unit 160 is configured by a button, a touch panel, or a remote controller, for example.

The storage unit 150a is configured by a non-volatile storage device. The storage device 150a may be configured as a ROM, or configured as an external storage device such as a USB memory.

On the storage unit 150a, image data of the measurement pattern MPa which is used by the second projector 100b for stack correction is stored in advance. The projection control unit 131a reads the image data of the measurement pattern MPa from the storage unit 150a and causes the projection unit 120a to project and display the measurement pattern MPa on the projection screen SC in the stack correction processing by the image display system 10 as will be described later in detail.

Figure 3:
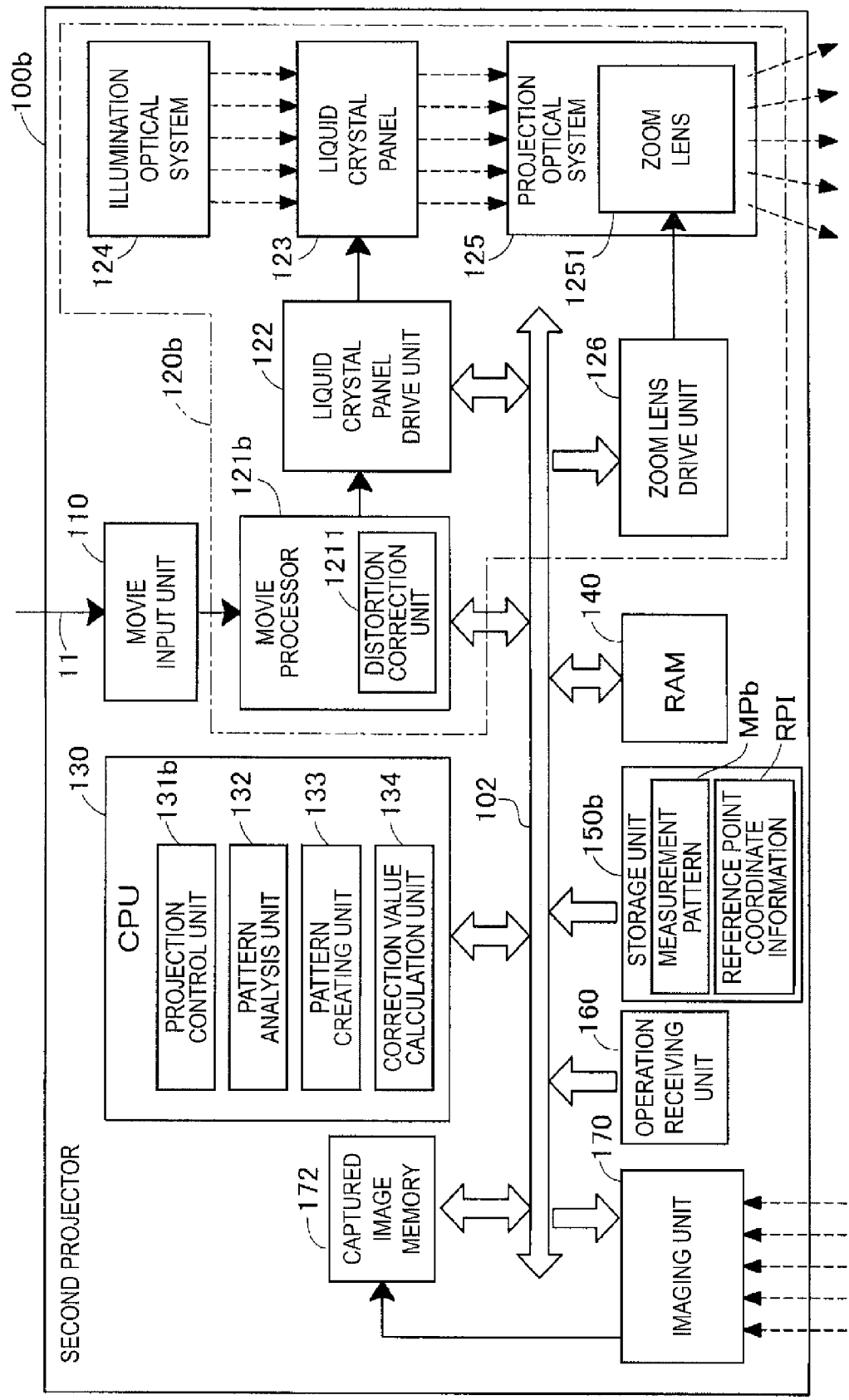
FIG. 3 is an outlined diagram showing an internal configuration of a second projector.

FIG. 3 is an outlined diagram showing an internal configuration of the second projector 100b. The second projector 100b has the same configuration as that of the first projector 100a (FIG. 2) other than the point described below. In FIG. 3, same reference numerals as those in FIG. 2 are applied to the same components as those in the first projector 100a.

The second projector 100b is provided with an imaging unit 170 and a captured image memory 172. The imaging unit 170 is configured by an image sensor such as a CMOS sensor or a CCD sensor, for example. The imaging unit 170 is fixed to and installed at a position distant away from the projection optical system 125 by a predetermined space, from which the imaging unit 170 can image a projection target of the projection optical system 125. The imaging unit 170 is connected to the internal bus 102 and images the projection screen SC, on which the second projector 100b is projecting the projection image, under control by a projection control unit 131b.

The captured image memory 172 is connected to the imaging unit 170 via a signal line, and captured image data of the imaging unit 170 is stored thereon. The captured image memory 172 is connected to the internal bus 102. The CPU 130 can read the captured image data stored on the captured image memory 172 via the internal bus 102.

The CPU 130 of the second projector 100b functions as the projection control unit 131b which causes a projection unit 120b to execute display processing of the projection image. The projection control unit 131b matches the coordinate system of the projection image of the first projector 100a with the coordinate system of the projection image of itself by using the image captured by the imaging unit 170 and executes stack correction for overlapping the projection images of both the first and second projectors 100a and 100b.

The CPU 130 further functions as a pattern analysis unit 132, a pattern creating unit 133, and a correction value calculation unit 134 in executing the stack correction. Specific functions of the respective functional units 132, 133, and 134 will be described later.

The projection unit 120b provided in the second projector 100b has the same configuration as that of the projection unit 120a of the first projector 100a other than that the projection unit 120b is provided with a movie processor 121b instead of the movie processor 121a. The movie processor 121b of the second projector 100b is provided with a distortion correction unit 1211. The distortion correction unit 1211 corrects an image signal for projection display, which is acquired from the movie input unit 110, in accordance with a correction value calculated in the stack correction by the projection control unit 131b.

A storage unit 150b of the second projector 100b can be configured by the same storage device as the storage unit 150a of the first projector 100a. On the storage unit 150b of the second projector 100b, image data of a measurement pattern MPb, which is an image of a measurement pattern to be used in the stack correction, and reference point coordinate information RPI are stored in advance. The measurement pattern MPb and the reference point coordinate information RPI will be described later.

Figure 4:
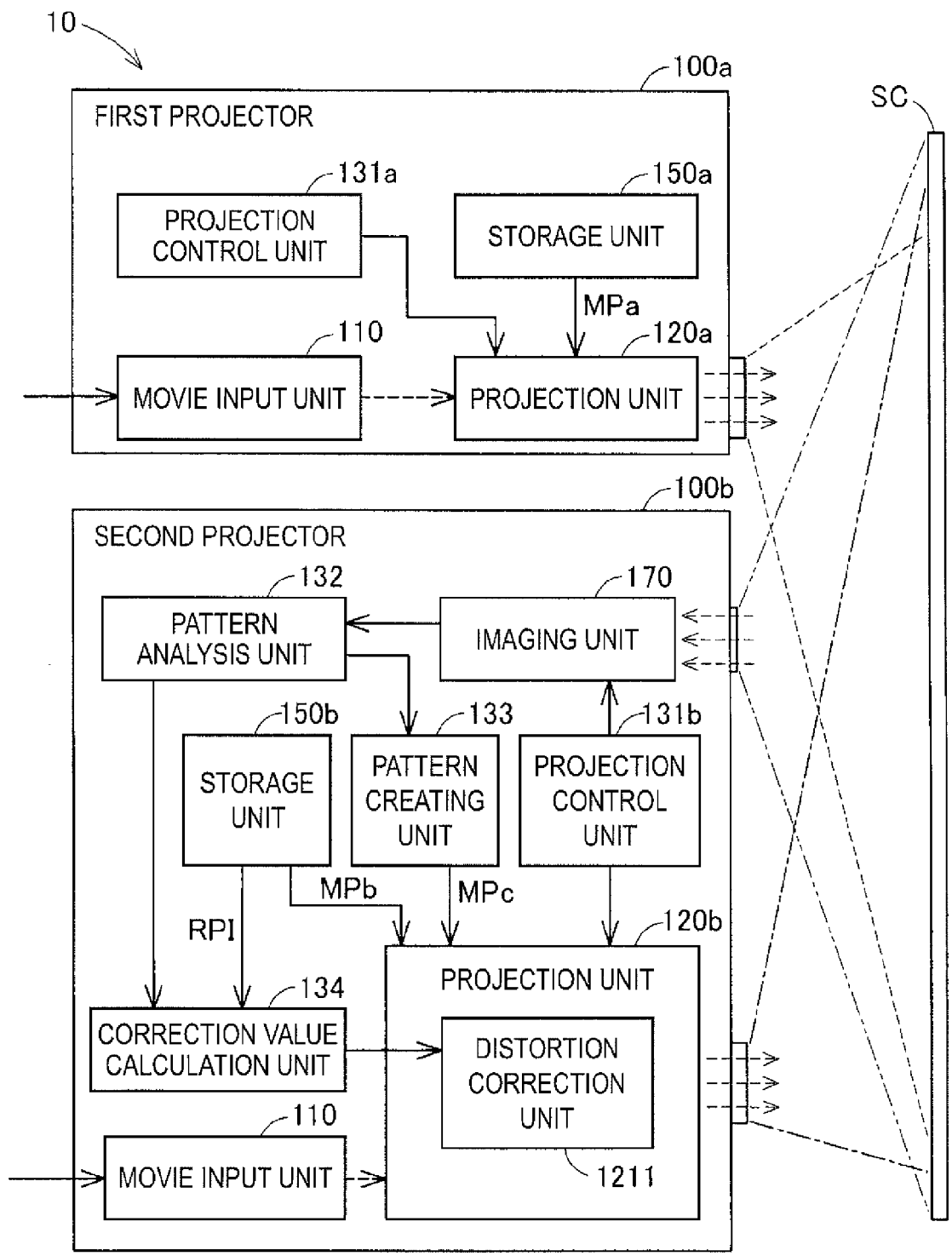
FIG. 4 is a functional block diagram of the image display system when stack correction processing is executed.

FIG. 4 is a functional block diagram of the image display system 10 when the stack correction processing is executed. In FIG. 4, main components and functional units of the first and second projectors 100a and 100b are extracted and displayed for the purpose of convenience of explanation, and cooperation thereof in the stack correction processing is represented by arrows. In addition, reference numerals in FIG. 4 correspond to the reference numerals in FIGS. 2 and 3. Hereinafter, a detailed description will be given of content of the stack correction processing with reference to FIG. 4.

Figure 5:
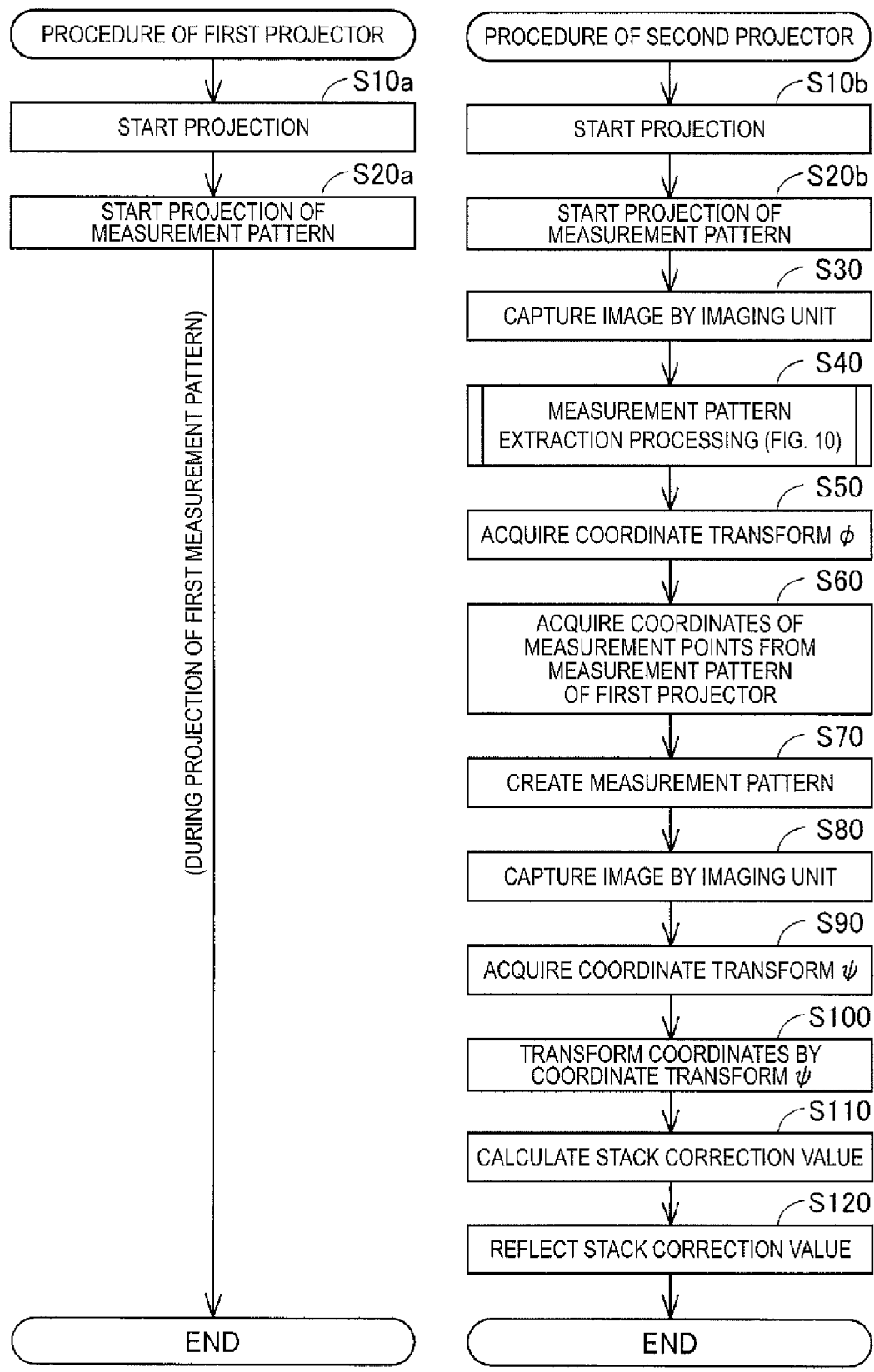
FIG. 5 is an explanatory diagram showing a procedure of the stack correction processing by the image display system.

FIG. 5 is an explanatory diagram showing a procedure of the stack correction processing by the image display system 10. In FIG. 5, flowcharts showing processing procedures of the first and second projectors 100a and 100b are shown in the left and right in the paper. In addition, the first and second projectors 100a and 100b are in a state where supply of movie signals from the movie input unit 110 to the projection units 120a and 120b are stopped during the execution of the stack correction processing.

In Steps S10a and S10b, the first and second projectors 100a and 100b are respectively caused to start projection on the projection screen SC. In this process, it is preferable to make an adjustment such that the projection area PAa of the first projector 100a is within the projection area PAb of the second projector 100b on the projection screen SC. The adjustment may be manually performed by the user, or automatically performed by a mechanism which performs positional adjustment of the projectors.

The projection control unit 131a of the first projector 100a causes the projection unit 120a to project and display the measurement pattern MPa on the projection screen SC by using the image data of the measurement pattern MPa which is stored on the storage unit 150a (Step S10a). On the other hand, the projection control unit 131b of the second projector 100b causes the projection unit 120b to project and display the measurement pattern MPb on the projection screen SC by using the image data of the measurement pattern MPb which is stored on the storage unit 150b (Step S10b).

Figure 6:
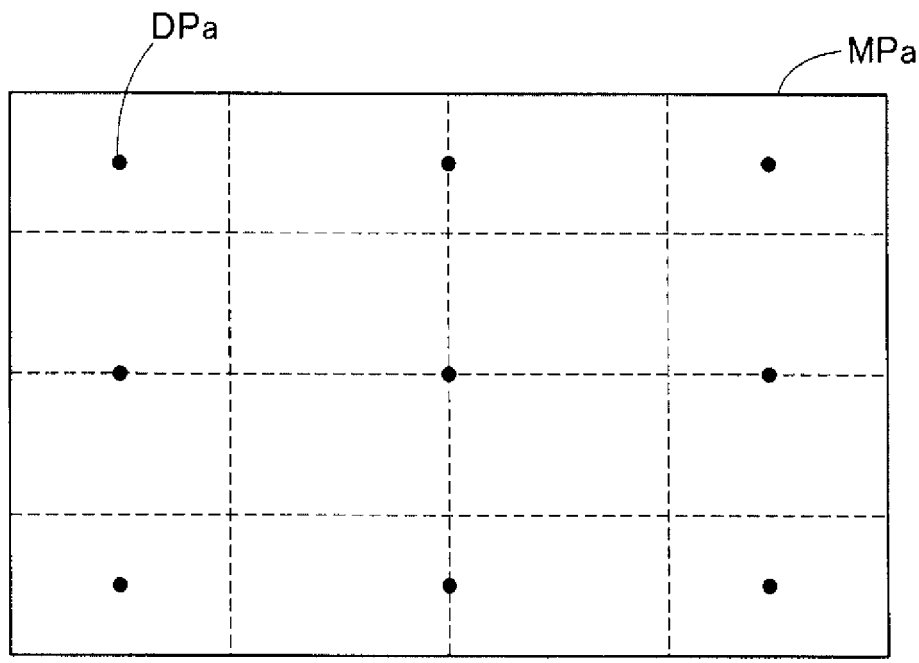
FIG. 6 is a diagram schematically showing an example of a measurement pattern which is projected and displayed by the first projector.

FIG. 6 is a diagram schematically showing an example of the measurement pattern MPa which is projected and displayed by the first projector 100a. In FIG. 6, lines which quarter the image in the vertical direction and the horizontal direction are shown by broken lines for the purpose of convenience of explanation. The measurement pattern MPa is configured by figures and symbols which represent a plurality of measurement points, the coordinates of which are detected in the stack correction. A dot mark is displayed at each measurement point DPa in the measurement pattern MPa according to this embodiment.

It is preferable that measurement points DPa are set at least at positions corresponding to four corners of the image in the measurement pattern MPa in order to facilitate the detection of the coordinate system of the projection image by the first projector 100a in the stack correction. More specifically, at least one measurement point DPa is preferably present within a divided region positioned at each of four corners of the image when the image is equally divided into four parts in the vertical direction and the horizontal direction.

In addition, the measurement points DPa are set at the following nine locations in the measurement pattern MPa according to this embodiment. One of the measurement points DPa is set at the center of the divided region positioned at each of the aforementioned four corners of the image, another measurement point DPa is set at an intermediate position which is interposed between the measurement points DPa at the corners, and still another measurement point DPa is set at a position at the center of the image, respectively.

Figure 7:
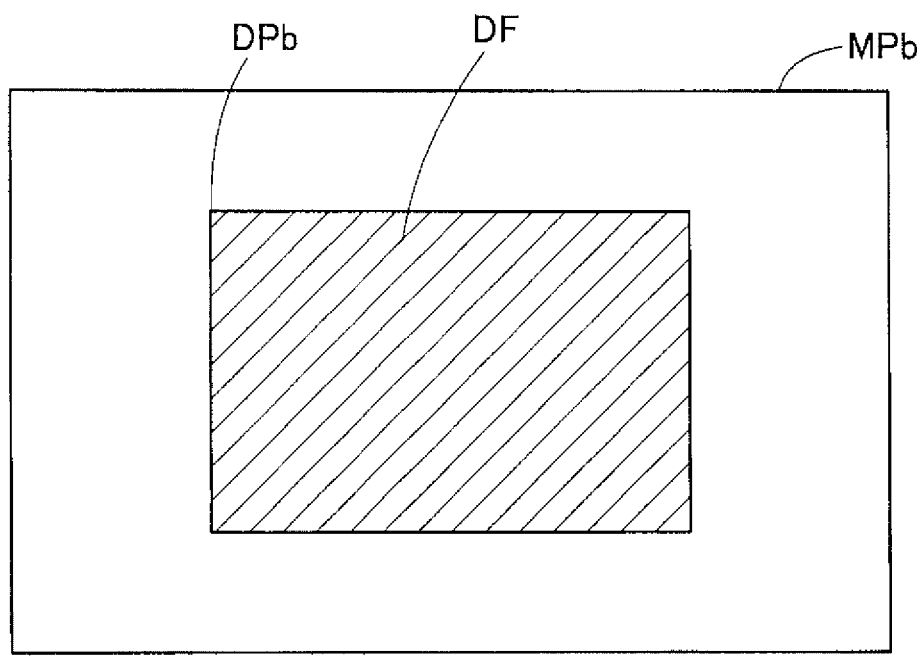
FIG. 7 is a diagram schematically showing an example of a measurement pattern which is projected and displayed by the second projector.

FIG. 7 is a diagram schematically showing an example of the measurement pattern MPb which is projected and displayed by the second projector 100b. The measurement pattern MPb is configured by figures and symbols which represent a plurality of measurement points DPb, the coordinates of which are detected in stack correction, in the same manner as the aforementioned measurement pattern MPa. A rectangular figure DF is displayed at the center of the image of the measurement pattern MPb according to this embodiment, and four corners of the rectangular figure DF represent four measurement points DPb, respectively.

Figure 8:
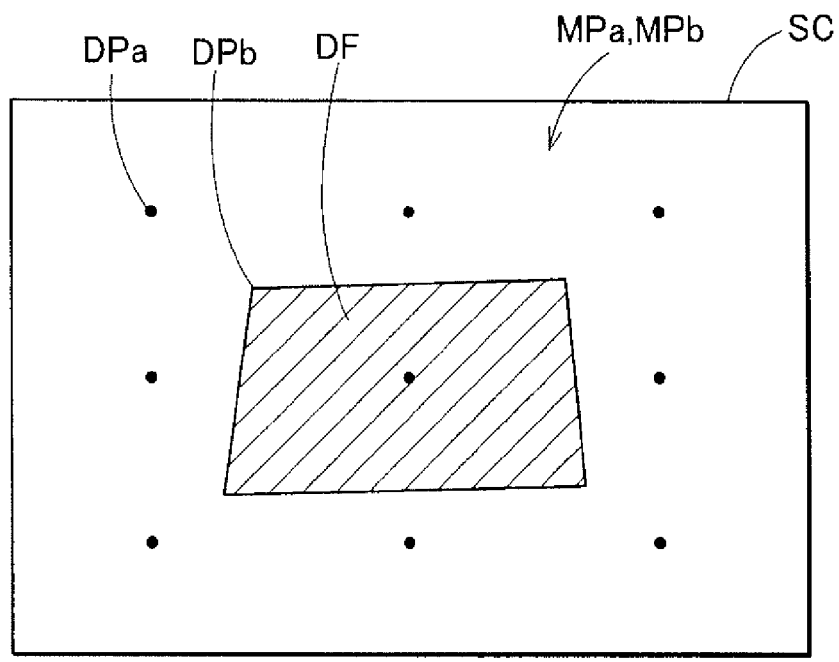
FIG. 8 is a diagram schematically showing a projection screen on which the measurement patterns are respectively projected and displayed by the first and second projectors.

FIG. 8 is a diagram schematically showing the projection screen SC, on which the measurement patterns MPa and MPb are respectively projected and displayed by the first and second projectors 100a and 100b. On the projection screen SC, the projection image of the measurement pattern MPa which is projected by the first projector 100a and the projection image of the measurement pattern MPb which is projected by the second projector 100b are displayed in an overlapped manner.

Since distortion of the projection image by the second projector 100b has not been corrected in this stage, a rectangular figure DF of the measurement pattern MPb is projected and displayed in a distorted manner on the projection screen SC. In addition, it is preferable that distortion of the projection image by the first projector 100a has been adjusted by keystone correction or the like in this stage.

Figure 9:
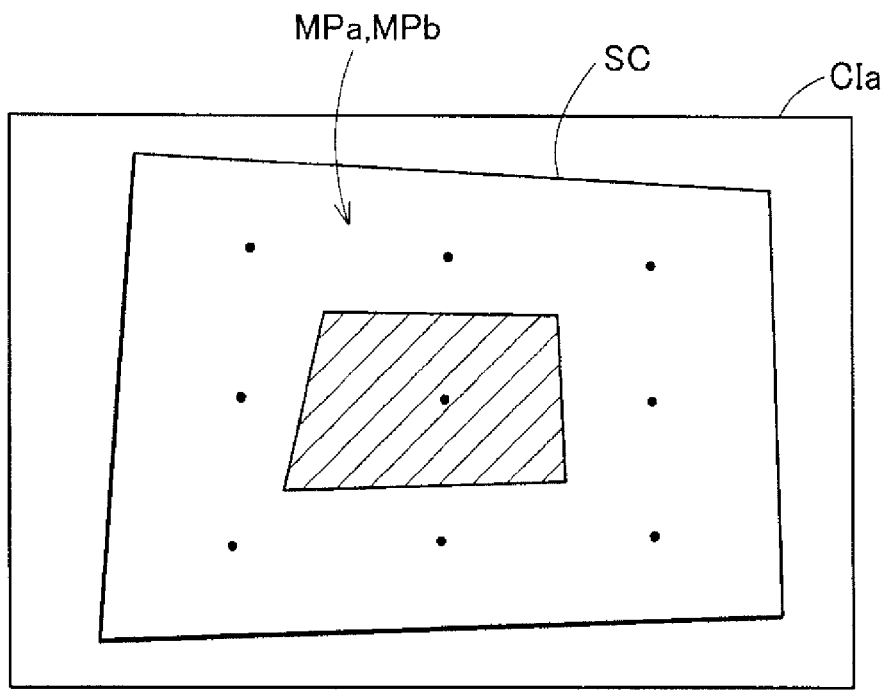
FIG. 9 is a diagram schematically showing a captured image which is obtained by an imaging unit of the second projector.

FIG. 9 is a diagram schematically showing a captured image which is acquired by the imaging unit 170 of the second projector 100b in Step S30 (FIG. 5). In Step S30, The projection control unit 131b of the second projector 100b causes the imaging unit 170 to image the projection screen SC and obtains a captured image CIa.

In the captured image CIa, the entire projection screen SC, on which the two measurement patterns MPa and MPb are projected in the overlapped manner, is imaged. In measurement pattern extraction processing in Step S40 described below, processing for extracting the measurement pattern MPb of the second projector 100b from the captured image CIa is executed.

Figure 10:
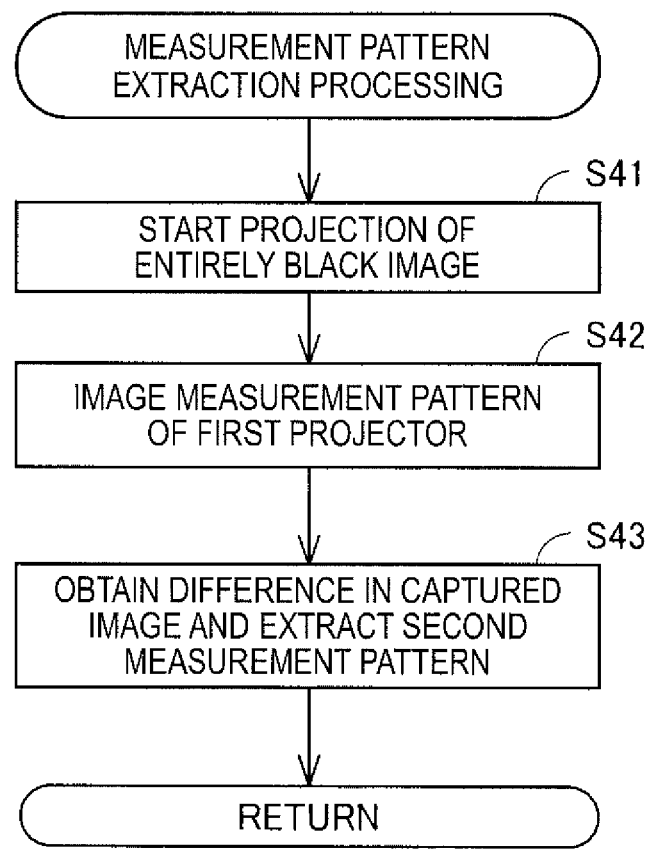
FIG. 10 is an explanatory diagram showing a procedure of measurement pattern extraction processing.
Figure 11A:
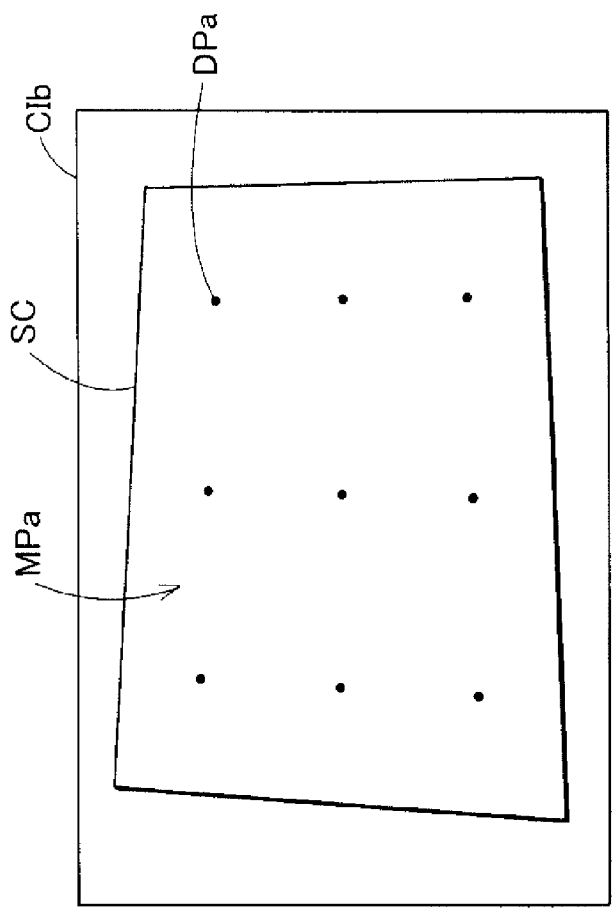
FIGS. 11A and 11B are explanatory diagrams for illustrating content of the measurement pattern extraction processing.
Figure 11B:
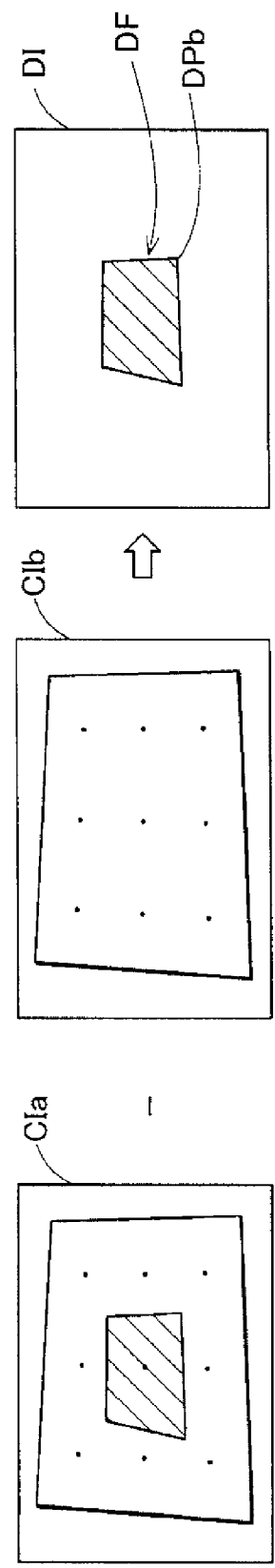

FIG. 10 is a flowchart showing a procedure of the measurement pattern extraction processing in Step S40. FIGS. 11A and 11B are explanatory diagrams for illustrating content of the measurement pattern extraction processing. FIG. 11A is a diagram schematically showing a captured image CIb which is acquired by the imaging unit 170 of the second projector 100b. FIG. 11B is an outlined diagram showing a principle based on which the measurement pattern MPb is extracted from the two captured images CIa and CIb.

In Step S41 (FIG. 10), the second projector 100b completes the projection and the display of the measurement pattern MPb and starts projection and display of an entirely black image. In Step S42, the second projector 100b causes the imaging unit 170 to image the projection screen SC and acquires the captured image CIb (FIG. 11A). In the captured image CIb, a state where only the measurement pattern MPa which is projected by the first projector 100a is displayed on the projection screen SC is captured.

In Step S43, the pattern analysis unit 132 of the second projector 100b creates a difference image DI based on a difference between the two captured images CIa and CIb which are acquired by the imaging unit 170 (FIG. 11B). Since the projection screen SC and the measurement pattern MPa in the captured image CIb are removed from the captured image CIa, the rectangular figure DF of the measurement pattern MPb is extracted and remains in the difference image DI.

FIG. 12A is a diagram schematically illustrating a process for acquiring coordinate transform $\phi$ in Step S50 (FIG. 5). In FIG. 12A, a diagram schematically showing the difference image DI and a diagram schematically showing a panel surface of the liquid crystal panel 123 of the second projector 100b when the measurement pattern MPb is projected and displayed thereon are shown together.

Here, a coordinate system on the captured image which is acquired by the imaging unit 170 will be referred to as an "imaged coordinate system", and coordinates on the imaged coordinate system will be referred to as "imaged coordinates" in the following description in this specification. In addition, a coordinate system on an image formation area 123i which is an area where an image is formed in the panel surface of the liquid crystal panel 123 will be referred to as a "panel coordinate system", and coordinates in the panel coordinate system will be referred to as "panel coordinates". The "panel coordinate system" and the "panel coordinates" in the following description mean a panel coordinate system and panel coordinates on the liquid crystal panel 123 of the second projector 100b unless otherwise noted.

First, in Step S50, the pattern analysis unit 132 of the second projector 100b detects coordinates of the four corners of the rectangular figure DF in the difference image DI which has been acquired in the pattern extraction processing. The coordinates correspond to imaged coordinates $(X_b, Y_b)$ of each measurement point DPb in the measurement pattern MPb in the captured image CIa.

Next, the pattern analysis unit 132 acquires panel coordinates $(x_b, y_b)$ of each measurement point DPb in the measurement pattern MPb based on image data of the measurement pattern MPb. The pattern analysis unit 132 derives the coordinate transform $\phi$ which is acquired as projection transform of the imaged coordinate system and the panel coordinate system based on the imaged coordinates $(X_b, Y_b)$ and the panel coordinates $(x_b, y_b)$ of each measurement point DPb in the measurement pattern MPb.

FIG. 12B is a diagram schematically illustrating a process for acquiring panel coordinates of each measurement point DPa in the measurement pattern MPa which is projected and displayed by the first projector 100a in Step S60 (FIG. 5). In FIG. 12B, a diagram schematically showing the captured image CIb which is acquired in the measurement pattern extraction processing and a diagram schematically showing the panel surface of the liquid crystal panel 123 of the second projector 100b are shown together.

First, in Step S60, the pattern analysis unit 132 detects imaged coordinates $(X_a, Y_a)$ of each measurement point DPa from the captured image CIb in which only the measurement pattern MPa of the first projector 100a is displayed. Next, the pattern analysis unit 132 acquires panel coordinates $(x_{ap}, y_{ap})$ which are coordinates obtained by transforming the imaged coordinates $(X_a, Y_a)$ of each measurement point DPa in the coordinate transform $\phi$ acquired in Step S50.

Here, a correspondence relationship between the imaged coordinate system and the panel coordinate system is affected by lens distortion of the projection optical system 125 and the imaging unit 170 in some cases. Particularly, the lens distortion locally occurs in an outer circumferential area of lenses or the like. Since the imaged coordinate system and the panel coordinate system are uniformly transformed in the coordinate transform $\phi$, there is a possibility that the influence of such local lens distortion has not been reflected in the coordinate transform result by the coordinate transform $\phi$. Thus, the second projector 100b according to this embodiment derives coordinate transform $\psi$ by which it is possible to execute more precise coordinate transform which reflects the influence of such local lens distortion by a process described below.

In Step S70 (FIG. 5), the pattern creating unit 133 of the second projector 100b creates a new measurement pattern for acquiring the coordinate transform $\psi$. Specifically, the pattern creating unit 133 creates image data of a measurement pattern in which a plurality of measurement points are set around the coordinates corresponding to the panel coordinates $(x_{ap}, y_{ap})$ of each measurement point DPa in the measurement pattern MPa which are acquired in Step S60.

Figure 13:
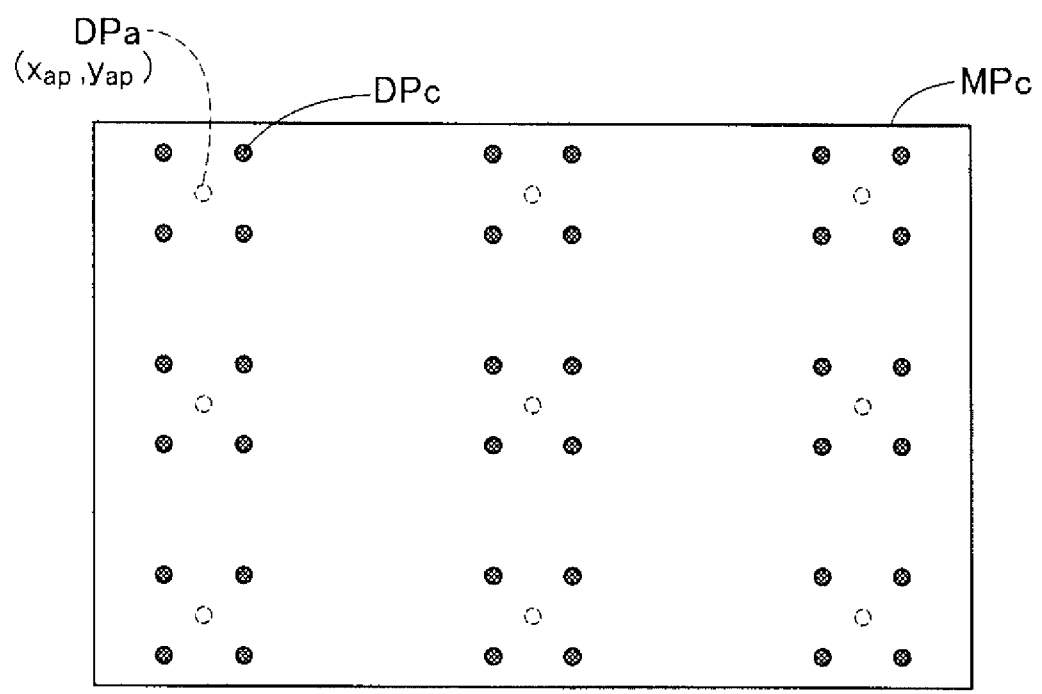
FIG. 13 is a diagram schematically showing an example of a measurement pattern which is newly generated.

FIG. 13 is a diagram schematically showing an example of a measurement pattern MPc which is newly created by the pattern creating unit 133 in Step S70. In FIG. 13, dot marks which are displayed in the measurement pattern MPa are shown by broken lines at positions corresponding to the panel coordinates ($x_{ap}$, $y_{ap}$) of the respective measurement points DPa for convenience.

In the measurement pattern MPc according to this embodiment, measurement points DPc are set at four points (total of 36 locations) which surround positions represented by the panel coordinates ($x_{ap}$, $y_{ap}$) of the respective measurement points DPa. More specifically, the measurement points DPc are set at positions which are offset from the positions represented by the panel coordinates ($x_{ap}$, $y_{ap}$) of the respective measurement points DPa by a predetermined distance in upper and lower oblique directions in the left and the right. In addition, the respective measurement points DPc are shown by dot marks in the measurement pattern MPc according to this embodiment. As described above, the measurement pattern MPc according to this embodiment has a different alignment of the dot marks from that in the measurement pattern MPa.

In Step S80 (FIG. 5), the second projector 100b causes the projection unit 120b to project the measurement pattern MPc which is created by the pattern creating unit 133. Then, the imaging unit 170 images the projection screen SC, on which the measurement pattern MPc is projected and displayed.

Figure 14A:
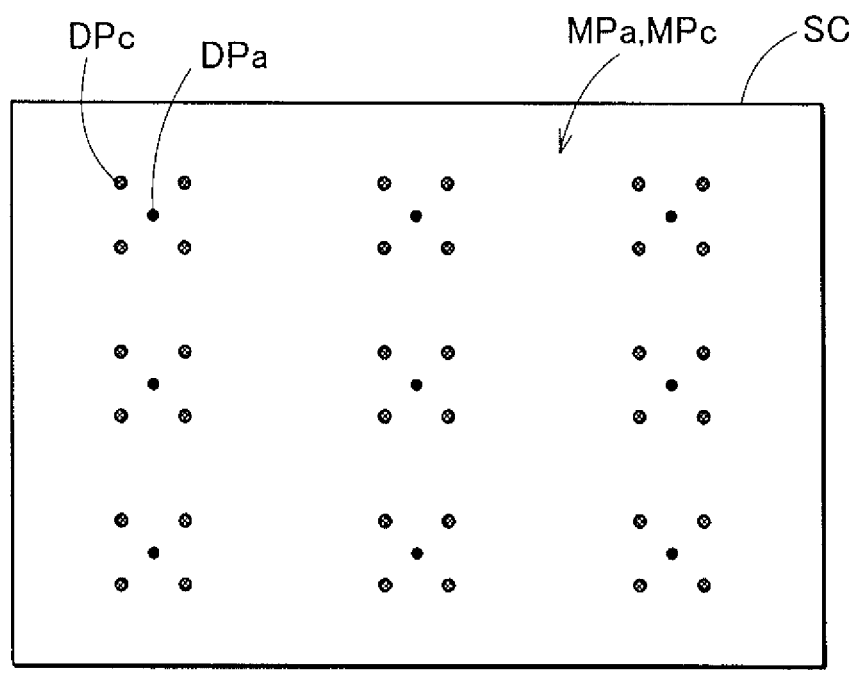
FIGS. 14A and 14B are diagrams schematically showing a projection screen when the measurement pattern is projected and displayed and a captured image on the projection screen at that time.
Figure 14B:
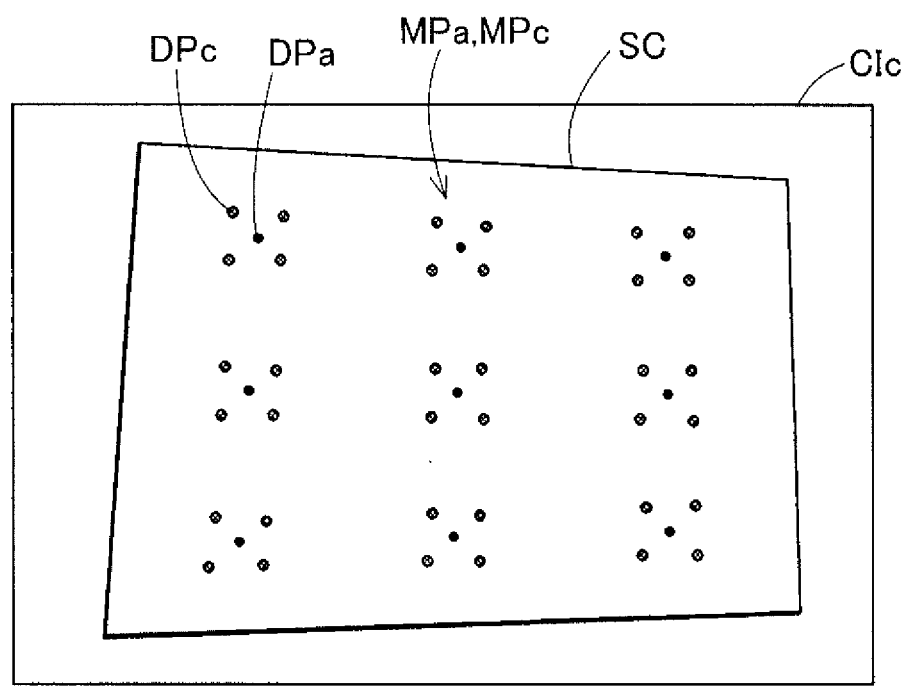

FIG. 14A is a diagram schematically showing the projection screen SC when the measurement pattern MPc is projected and displayed, and FIG. 14B is a diagram schematically showing a captured image CIc of the projection screen SC at that time. The measurement pattern MPc is projected so as to be overlapped with the projection image of the measurement pattern MPa which is projected by the first projector 100a.

However, the measurement pattern MPc is created such that the measurement points DPc are aligned around the measurement points DPa in the projection image of the measurement pattern MPa when the measurement pattern MPC is projected and displayed on the projection screen SC. Therefore, the dot marks which represent the respective measurement points DPc in the measurement pattern MPc are in a state where the respective points DPc are aligned around the dot marks which represent the measurement points DPa in the measurement pattern MPa.

FIG. 15 is a diagram schematically illustrating a process for obtaining the coordinate transform ψ in Step S90 (FIG. 5). In FIG. 15, a diagram schematically showing the captured image CIc in the same manner as in FIG. 14B and a diagram schematically showing the panel surface of the liquid crystal panel 123, on which the image of the measurement pattern MPc is formed in the image formation area 123i, are shown together. In addition, a plurality of circles depicted by broken lines in FIG. 15 schematically represent that the measurement points DPc in the measurement pattern MPc are classified into groups (grouping).

First, in Step S90, the pattern analysis unit 132 of the second projector 100b detects the captured coordinates ($X_c$, $Y_c$) of the respective measurement points in the measurement pattern MPc from the captured image CIc which is acquired in Step S80. In addition, the imaged coordinates ($X_c$, $Y_c$) can be easily and quickly detected by scanning an area in the vicinity of the imaged coordinates ($X_a$, $Y_a$) of the respective measurement points DPa in the measurement pattern MPa which are acquired in Step S60.

Then, the pattern analysis unit 132 prepares panel coordinates ($x_c$, $y_c$) of the respective measurement points DPc in the measurement pattern MPc. In addition, since the measurement pattern MPc is created by the pattern creating unit 133, the panel coordinates ($x_c$, $y_c$) in the measurement pattern MPc have been known. The pattern analysis unit 132 further classifies the circumferential respective measurement points DPc into a group for the respective measurement points DPa in the measurement pattern MPa. In addition, the measurement points DPc are classified into nine groups in this embodiment.

Then, the pattern analysis unit 132 derives a plurality of pieces of coordinate transform $\psi_1$ to $\psi_9$ as the coordinate transform ψ which is acquired as the projection transform of the imaged coordinate system and the panel coordinate system based on the imaged coordinates ($X_c$, $Y_c$) and the panel coordinate ($x_c$, $y_c$) for each group of the measurement points DPc. That is, the coordinate transform $\psi_1$ to $\psi_9$ is local coordinate transform which is acquired for each vicinity area of each measurement point DPa in the measurement pattern MPa.

Figure 16:
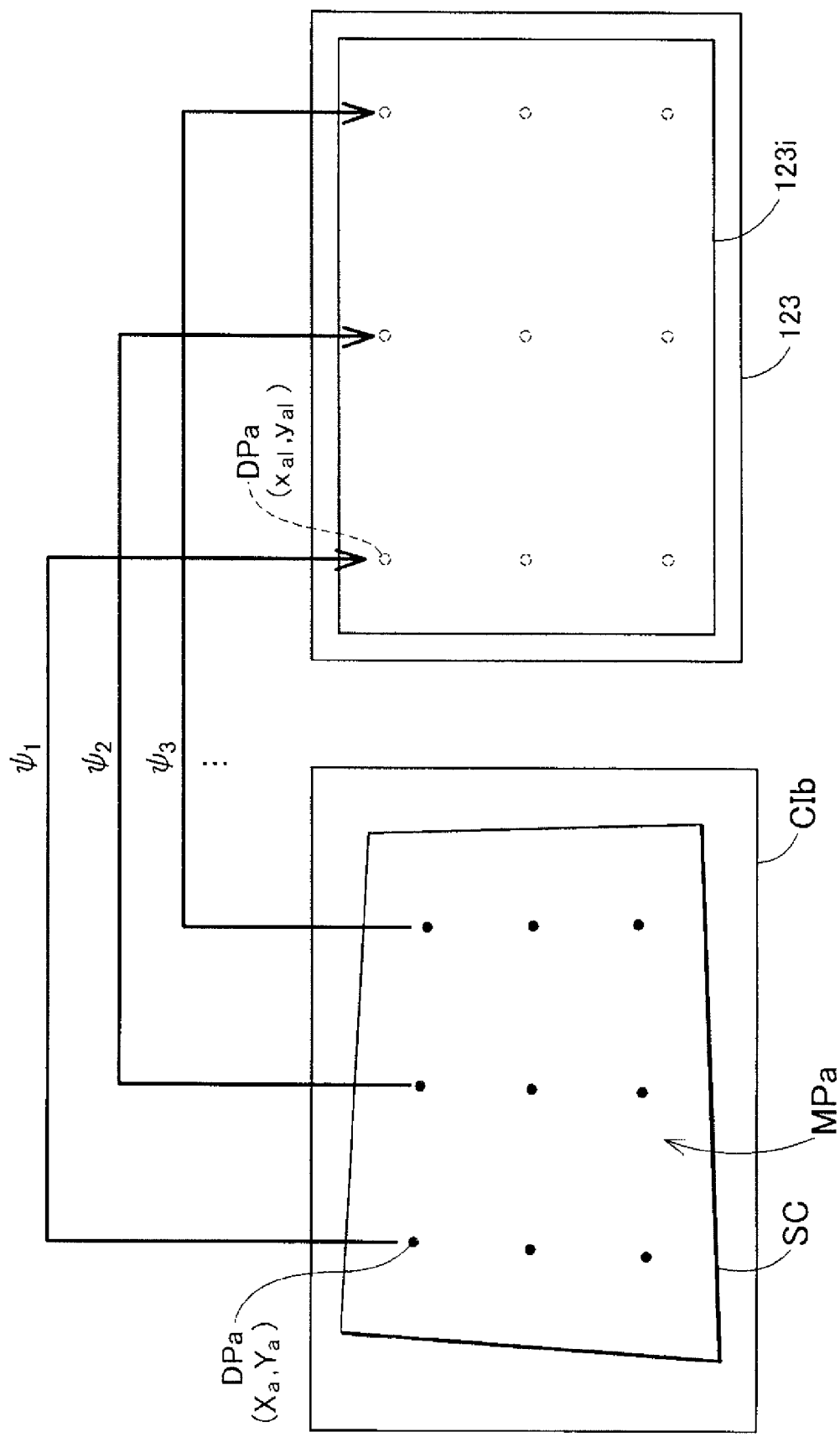
FIG. 16 is a diagram schematically illustrating a process for acquiring panel coordinates of respective measurement points in the measurement pattern by using the coordinate transform.

FIG. 16 is a diagram schematically illustrating a process for acquiring panel coordinates of each measurement point DPa in the measurement pattern MPa by using the coordinate transform ψ in Step S100. In FIG. 16, a diagram schematically showing the captured image CIb in the same manner as in FIG. 11A and a diagram schematically showing the panel surface of the liquid crystal panel 123 are shown together.

In Step S100, the pattern analysis unit 132 transforms the imaged coordinates ($X_a$, $Y_a$) of each measurement point DPa in the captured image CIb, which is acquired in Step S60, by the coordinate transform $\psi_1$ to $\psi_9$ for the respective measurement points DPa which are acquired in Step S90. In doing so, it is possible to acquire more correct panel coordinates ($x_{a1}$, $y_{a1}$) to which the influence of the local lens distortion and the like are reflected for each measurement point DPa in the measurement pattern MPa projected on the projection screen SC.

As can be understood from the above description, the pattern analysis unit 132 in this embodiment functions as an image analysis unit which detects the two measurement patterns MPa and MPc from the captured image which is acquired by the imaging unit 170. In addition, the pattern analysis unit 132 also functions as a correction processing unit which derives the correspondence relationship between the imaged coordinate system and the panel coordinate system and derives the panel coordinate of the measurement points DPa from the imaged coordinates of the respective measurement points DPa in the measurement pattern MPa based on the correspondence relationship.

In Step S110, the correction value calculation unit 134 acquires the panel coordinates P ($x_{a1}$, $y_{a1}$) from the pattern analysis unit 132 and acquires reference point coordinate information RPI (FIG. 3) from the storage unit 150b. The reference point coordinate information RPI includes image coordinates I ($x_{ai}$, $y_{ai}$) which are coordinates of respective points DPa on the image of the measurement pattern MPa.

The image coordinates I ($x_{ai}$, $y_{ai}$) correspond to the panel coordinates of each measurement point DPa when the image of the measurement pattern MPa is formed on the liquid crystal panel 123. Thus, the correction value calculation unit 134 cancels the difference between the panel coordinates P ($x_{a1}$, $y_{a1}$) which are acquired from the pattern analysis unit 132 and the image coordinates I ($x_{ai}$, $y_{ai}$) and calculates a stack correction value for causing both to coincide with each other by a known method. More specifically, after the coordinate values of other points on the panel coordinate system and the image coordinate system in addition to the panel coordinates P ($X_{a1}$, $y_{a1}$) and the image coordinates I ($x_{ai}$, $y_{ai}$) are complemented by a known method, and the correspondence relationship of the respective panel coordinates of the first and second projectors 100a and 100b are derived. Then, the stack correction value is calculated based on the correspondence relationship. In addition, the stack correction value is a parameter of coordinate transform ω for transforming the panel coordinates before the correction to the panel coordinates after the correction. The coordinate transform ω establishes the following Relational Expression (1) between the panel coordinates P ($x_{a1}$, $y_{a1}$) and the image coordinates I ($x_{ai}$, $y_{ai}$).

$$I(x_{ai}, y_{ai}) = \omega(P(x_{a1}, y_{a1})) \quad (1)$$

In Step S120, the second projector 100b starts projection display which reflects the stack correction value. Specifically, the distortion correction unit 1211 of the movie processor 121b acquires the stack correction value which is calculated in Step S110 from the correction value calculation unit 134 and starts distortion correction based on the stack correction value. In doing so, it is possible to cause the coordinate system of the projection image by the second projector 100b to coincide with the coordinate system of the projection image by the first projector 100a, and the respective projection images of the first and second projectors 100a and 100b are precisely overlapped.

As described above, the image display system 10 according to this embodiment is designed such that the second projector 100b projects the measurement pattern MPc including a different pattern while the first projector 100a projects and displays the measurement pattern MPa. Then, the second projector 100b performs the stack correction on its own projection image based on the projection images of the measurement patterns MPa and MPc. That is, it is possible to easily and quickly execute the stack projection only by the stack correction by the second projector 100b according to the image display system 10 of this embodiment.

In addition, it is possible to implement precise stack projection in combination with the second projector 100b even if the first projector 100a does not include a stack correction function and an imaging unit for capturing its own projection image according to the image display system 10 of this embodiment. Therefore, projectors which can be used as the first projector 100a can be more freely selected, and it is possible to easily configure the system which performs the stack projection. Furthermore, it is possible to omit a common control unit for controlling the projection processing of the first and second projectors 100a and 100b and to thereby suppress an increase in size and a complication of the system configuration.

Furthermore, local coordinate transform ψ for each image area is obtained, and the panel coordinate system and the imaged coordinate system are associated with each other in the image display system 10 according to this embodiment. Therefore, it is possible to reflect the influence of the local lens distortion and the like in the image area in the stack correction based on the captured image of the imaging unit 170 and enhance image quality of the stack projection.

In addition, the second projector 100b creates the measurement pattern MPc based on the captured image of the projection image of the measurement pattern MPa such that the marks representing the measurement pattern MPa and the marks representing the measurement pattern MPc are not overlapped with each other on the projection screen SC according to the image display system 10 of this embodiment. Therefore, it is possible to reliably detect the respective measurement points DPc in the measurement pattern MPc on the projection screen SC and suppress degradation of precision in the stack correction even when both the measurement pattern MPa and the measurement pattern MPc are displayed on the projection screen SC.

B. Second Embodiment

Figure 17:
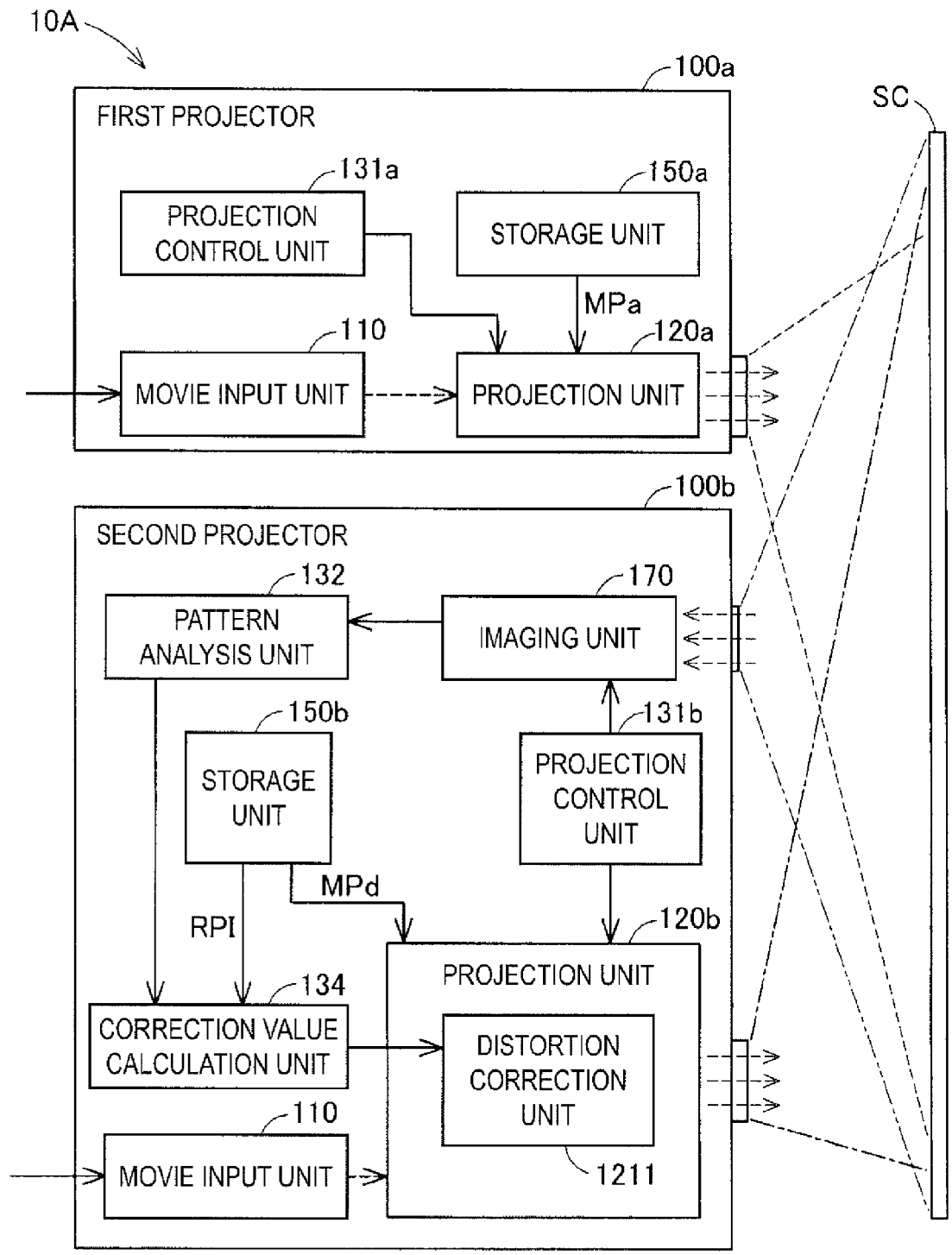
FIG. 17 is a functional block diagram of an image display system according to a second embodiment when stack correction processing is executed.

FIG. 17 is a functional block diagram when an image display system 10A according to a second embodiment of the invention executes the stack correction processing. FIG. 17 is substantially the same as FIG. 4 other than that the pattern creating unit 133 is omitted in the drawing and a reference numeral which represents a measurement pattern MPd is shown instead of the reference numeral which represents the measurement pattern MPb.

In the image display system 10A according to the second embodiment, the second projector 100b performs the stack correction by using the measurement pattern MPd for acquiring the coordinate transform ψ, which is stored on the storage unit 150b in advance, without creating the measurement pattern MPc. Hereinafter, a detailed description will be given of specific content of the stack correction processing which is executed by the image display system 10A according to the second embodiment with reference to FIG. 17. In addition, the configuration of the image display system 10A according to the second embodiment is substantially the same as the aforementioned configuration of the image display system 10 according to the first embodiment other than the points described below.

Figure 18:
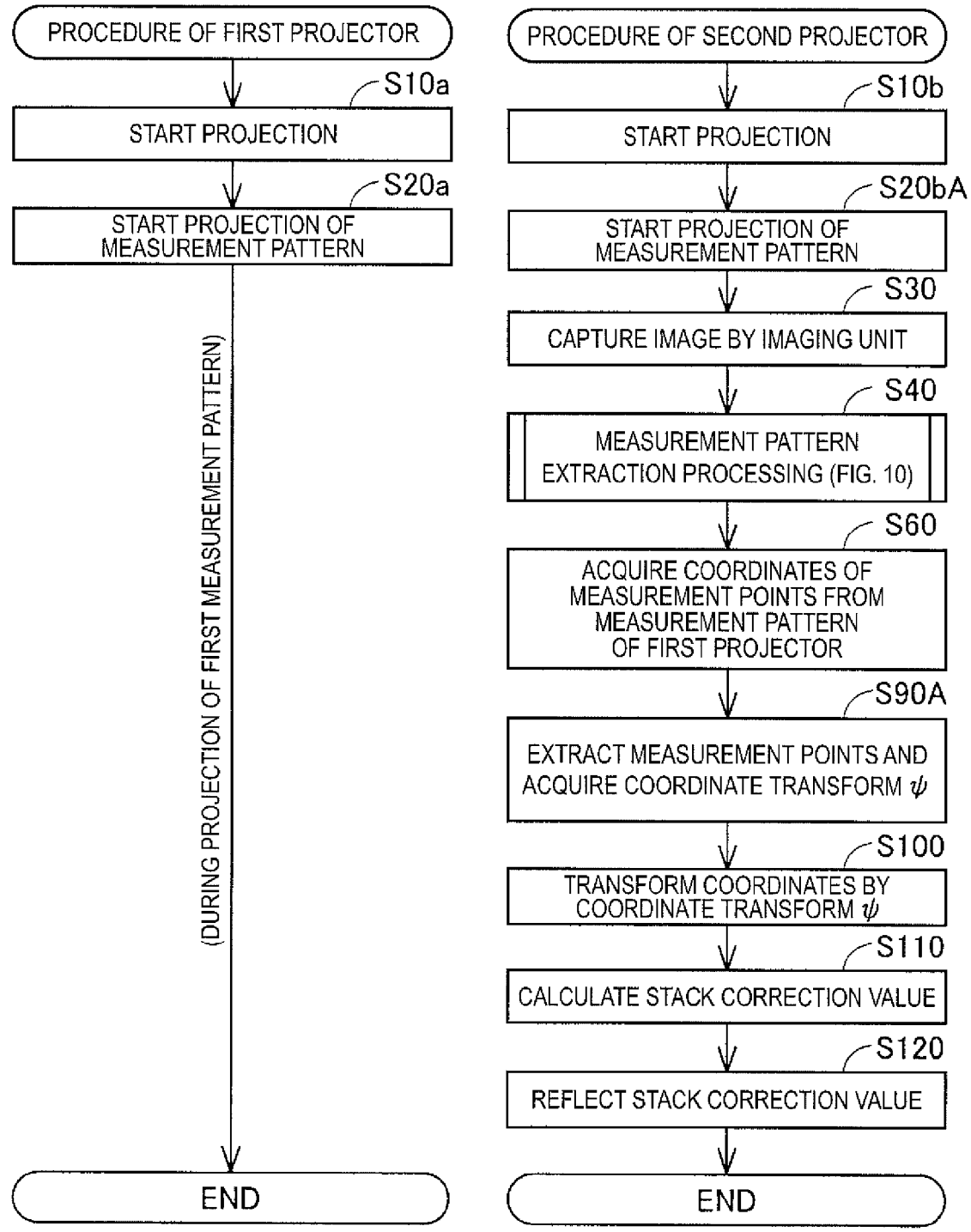
FIG. 18 is an explanatory diagram showing a procedure of stack correction processing which is executed by the image display system according to the second embodiment.

FIG. 18 is an explanatory diagram showing a procedure of the stack correction processing which is executed by the image display system 10A according to the second embodiment. FIG. 18 is substantially the same as FIG. 5 other than that Step S20bA is provided instead of Step S20b, that Step S50 is omitted, and that Step 90A is provided instead of Steps S70 to S90.

First, in the stack correction processing, the first and second projectors 100a and 100b start projection on the projection screen SC in the same manner as in the first embodiment (Steps S10a and S10b). Then, projection and display of the measurement pattern MPa (FIG. 6) by the first projector 100a is started, and projection and display of the measurement pattern MPd by the second projector 100b is started (Steps S20a and S20bA).

Figure 19A:
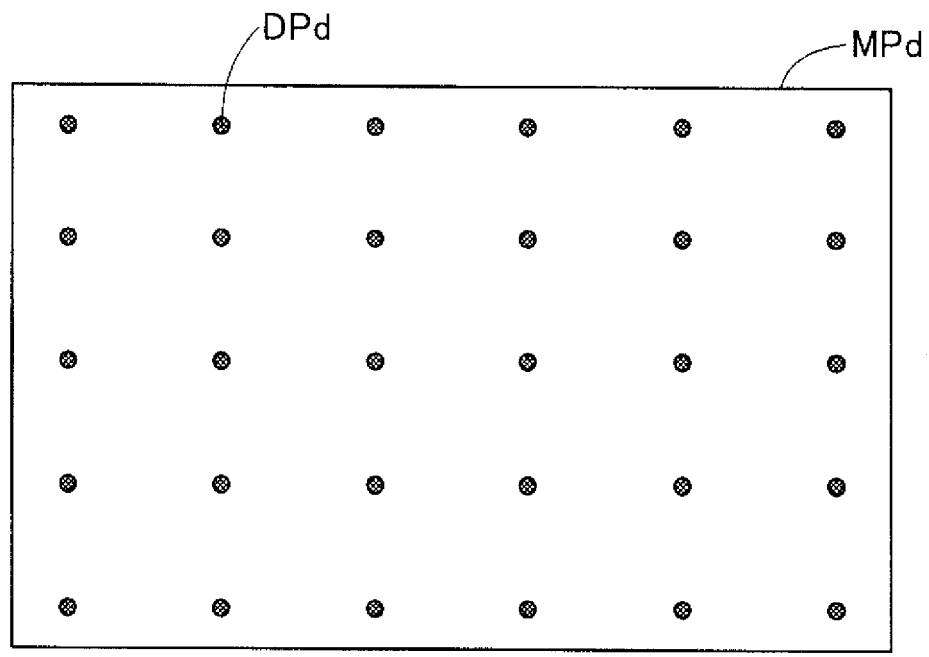
FIGS. 19A and 19B are diagrams schematically showing a measurement pattern which is projected and displayed by a second projector and a projection screen when respective measurement patterns of first and second projectors are projected and displayed.
Figure 19B:
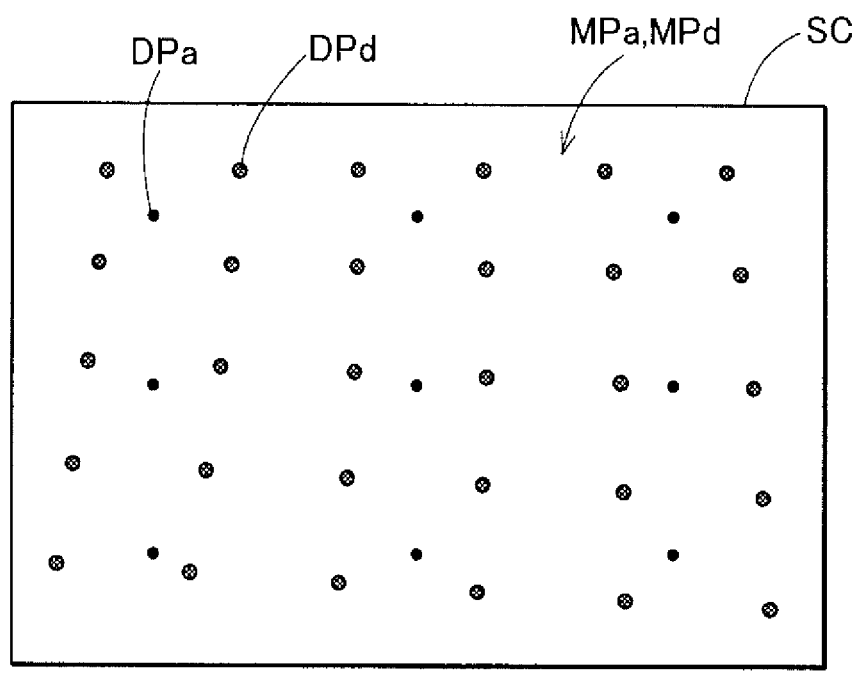

FIG. 19A is a diagram schematically showing an example of the measurement pattern MPd projected and displayed by the second projector 100b. FIG. 19B is a diagram schematically showing an example of a state where the respective measurement patterns MPa and MPb of the first and second projectors 100a and 100b are projected and displayed on the projection screen SC. In the measurement pattern MPd, a plurality of measurement points DPd which are aligned at equal intervals in the horizontal direction and the vertical direction of the image are set over the entire image, and dot marks representing the positions thereof are displayed at the measurement points DPd. In addition, the measurement pattern MPd has a different alignment (arranged coordinates) of the dot marks from that in the measurement pattern MPa.

Here, it is preferable that the measurement pattern MPd be configured such that the measurement points DPd which are not overlapped with the measurement points DPa in the measurement pattern MPa are present when the measurement pattern MPd is projected and displayed on the projection screen SC, on which the measurement pattern MPa is projected and displayed. Therefore, the measurement pattern MPd is configured to have an alignment cycle of the measurement points DPd which is equal to or less than ½ of an alignment cycle of the measurement points DPa in the measurement pattern MPa in this embodiment.

Figure 20A:
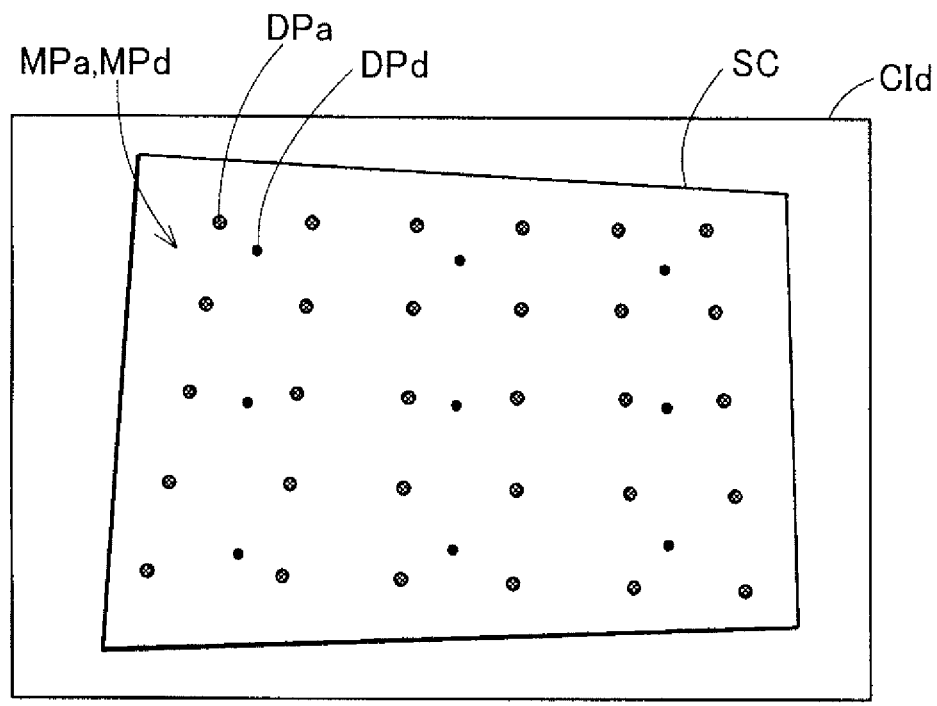
FIGS. 20A and 20B are diagrams schematically showing a captured image and a difference image.

FIG. 20A is a diagram schematically showing the captured image CId which is acquired in Step S30. In Step S30, the projection control unit 131b of the second projector 100b images the entire projection screen SC by the imaging unit 170 and acquires the captured image CId in which the projection images of the two measurement patterns MPa and MPd are overlapped with each other.

Figure 20B:
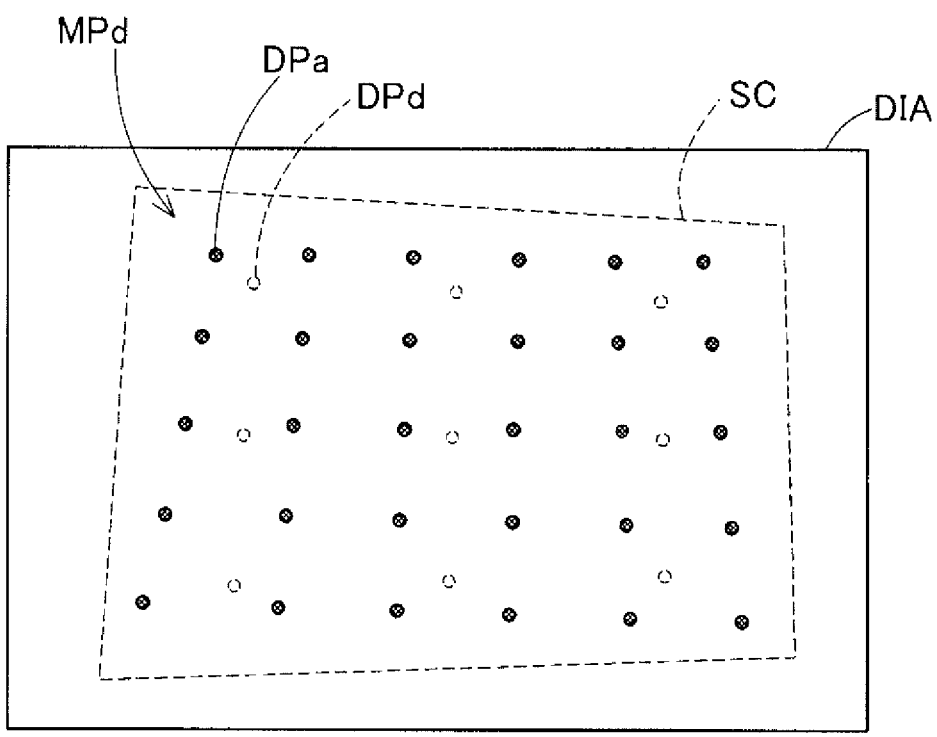

FIG. 20B is a diagram schematically showing a difference image DIA which is acquired in Step S40. In addition, in FIG. 20B, the dot marks which represent the measurement points DPa in the measurement pattern MPa and the projection screen SC, which have been removed in creating the difference image DIA, are shown by broken lines for the purpose of convenience.

In Step S40, the pattern analysis unit 132 of the second projector 100b executes the measurement pattern extraction processing described above in the first embodiment with reference to FIGS. 10 to 11. In doing so, the pattern analysis unit 132 acquires the captured image CIb (FIG. 11A) in which only the measurement pattern MPa is displayed and the difference image DIA (FIG. 20B) in which only the measurement pattern MPd is extracted and displayed.

In Step S60 (FIG. 18), the imaged coordinates $(X_a, Y_a)$ of the respective measurement points DPa in the measurement pattern MPa are acquired from the captured image CIb which is acquired in Step S40. In Step 90A, the same local coordinate transform $\psi$ for transforming the panel coordinate system and the imaged coordinate system for each image area as that in the aforementioned first embodiment is acquired by using the difference image DIA.

Figure 21:
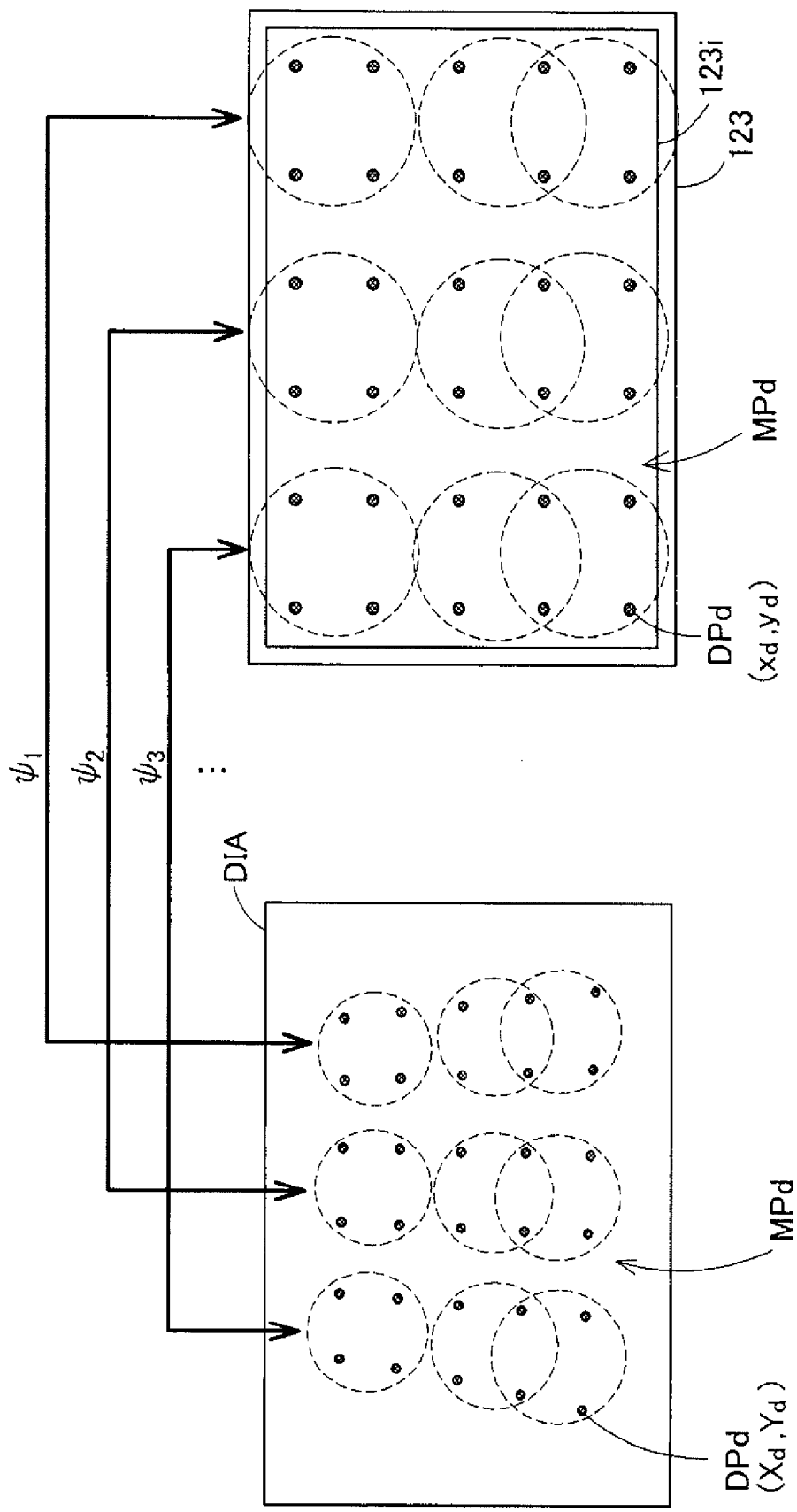
FIG. 21 is a diagram schematically illustrating a process for acquiring coordinate transform.

FIG. 21 is a diagram schematically illustrating a process for acquiring the coordinate transform $\psi$ in Step 90A. In FIG. 21, a diagram schematically showing the same difference image DIA as that in FIG. 20B and a diagram schematically showing the panel surface of the liquid crystal panel 123, on which the image of the measurement pattern MPd is formed, are shown together. In addition, a plurality of circles depicted by broken lines in FIG. 21 schematically show that the measurement points DPd in the measurement pattern MPd are classified into groups in the same manner as in FIG. 15.

In Step 90A, the pattern analysis unit 132 scans areas in the vicinity of the positions corresponding to the imaged coordinates $(X_a, Y_a)$ of the respective measurement points DPa in the measurement pattern MPa in the difference image DIA and acquires the imaged coordinates $(X_d, Y_d)$ of the measurement points DPd which are present in the areas. That is, the measurement points DPd which are present in the vicinity of the measurement points DPa in the measurement pattern MPa are extracted among the measurement points DPd in the measurement pattern MPd in this process. In addition, at least two or more measurement points DPd which are acquired from the imaged coordinates $(X_d, Y_d)$ may be extracted with respect to a measurement point DPa in the measurement pattern. MPa, and four or more measurement points DPd are preferably extracted.

Next, the pattern analysis unit 132 acquires the panel coordinates $(x_d, y_d)$ of the respective measurement points DPd which are extracted in the measurement pattern MPd. The pattern analysis unit 132 further classifies the respective measurement points DPd which are extracted in the vicinity area for each measurement point DPa in the measurement pattern MPa into groups.

Then, the pattern analysis unit 132 derives the plurality of pieces of coordinate transform $\psi_1$ to $\psi_9$ as coordinate transform $\psi$ for associating the imaged coordinate system with the panel coordinate system based on the imaged coordinates $(X_d, Y_d)$ and the panel coordinates $(x_d, y_d)$ for each group of the measurement points DPd. As described above, the local coordinate transform $\psi_1$ to $\psi_9$ for each image area are obtained even in the second embodiment in the same manner as in the aforementioned first embodiment.

In Step S100, the panel coordinates $(x_{a1}, y_{a1})$ of the respective measurement points DPa in the measurement pattern MPa are acquired by using the coordinate transform $\psi_1$ to $\psi_9$ in the same manner as in the first embodiment (FIG. 16). In Step S110, the correction value calculation unit 134 calculates the stack correction value for causing the panel coordinates $(x_{a1}, y_{a1})$ to coincide with the image coordinates $(x_{ai}, y_{ai})$ which are acquired from the reference point coordinate information RPI by the same known method as that described above. In Step S120, the second projector 100b causes the distortion correction unit 1211 to start projection and display which reflect the stack correction.

As described above, it is possible to omit the process for creating the measurement pattern by the pattern creating unit 133 and execute the stack correction by the second projector 100b by a simpler method in the second embodiment.

C. Modification Example

C1. Modification Example 1

In the above embodiments, the measurement patterns MPa, MPb, MPc, and MPd which are respectively projected and displayed by the first and second projectors 100a and 100b are not limited to the configurations shown in FIGS. 6, 7, 13, and 19A, and may be configured by other figures, symbols, characters, or the like which represent the measurement points. For example, the measurement pattern MPa which is projected and displayed by the first projector 100a may be configured as follows.

Figure 22A:
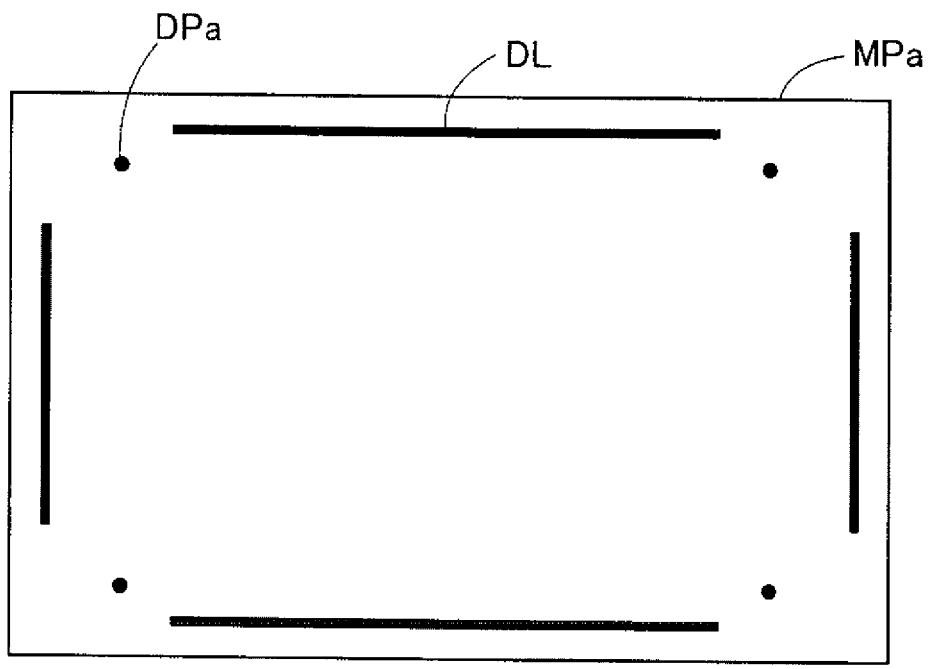
FIGS. 22A and 22B are diagrams schematically showing another configuration example of the measurement pattern.

FIG. 22A is a diagram schematically showing another configuration example of the measurement pattern MPa. In the measurement pattern MPa of this configuration example, four dot marks which represent the measurement points DPa are displayed at positions corresponding to four corners of the image. In addition, straight lines DL are displayed along outer circumferences of the image of the measurement pattern MPa of this configuration example.

Typically, it is easier to detect figures which represent lines or planes than to detect figures which represent dots such as dot marks on an image. Therefore, it is possible to more easily and quickly detect the measurement points DPa by detecting the straight lines DL and then detecting the dot marks which represent the measurement points DPa based on the positions of the straight lines DL when the straight lines DL are displayed in the measurement pattern MPa as in the configuration example in FIG. 22A. In addition, ends of the straight lines DL may be configured in the same manner as that for representing the measurement points DPa in the measurement pattern MPa of this configuration example.

Figure 22B:
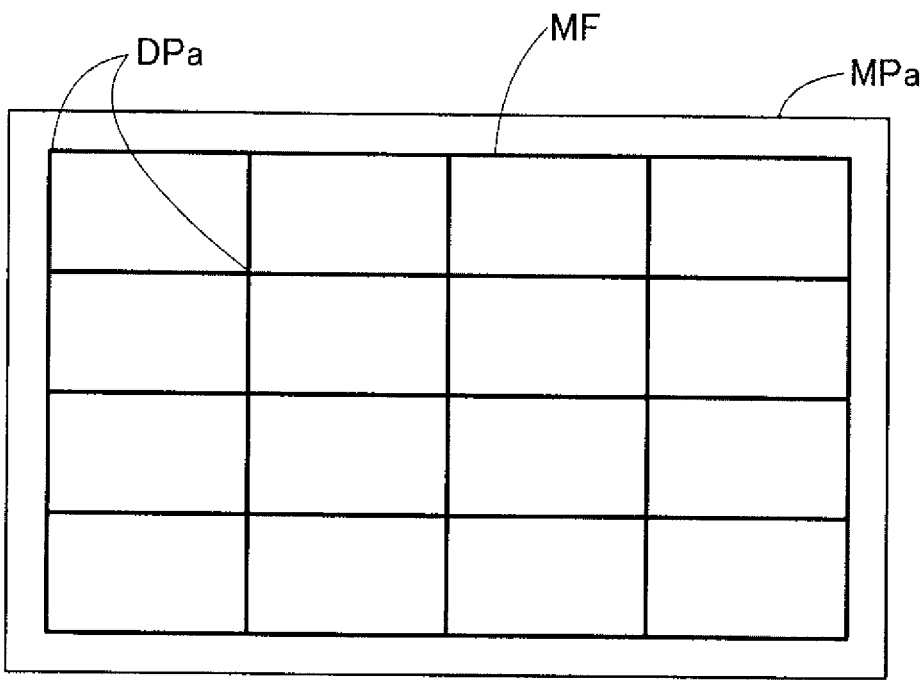

FIG. 22B is a diagram schematically showing another configuration example of the measurement pattern MPa. In the measurement pattern MPa of this configuration example, a grid-shaped mesh frame MF is displayed over the entire image. In the measurement pattern MPa, the four corners and the intersection between the straight lines of the mesh frame MF represent the measurement point DPa. With such a configuration of the measurement pattern MPa, it is possible to easily detect the measurement points DPa.

C2. Modification Example 2

The stack correction by the image display system 10 as described above in the embodiments can be executed as follows, for example.

Figure 23A:
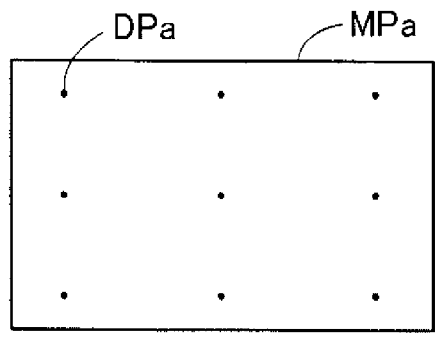
FIGS. 23A to 23C are diagrams schematically illustrating a stack correction method according to a modification example.
Figure 23B:
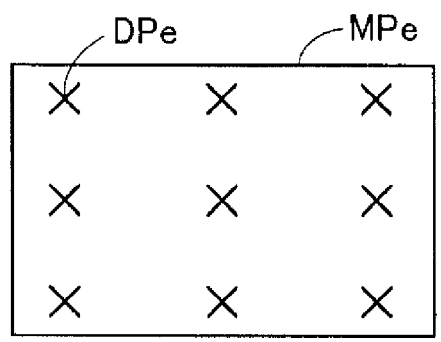
Figure 23C:
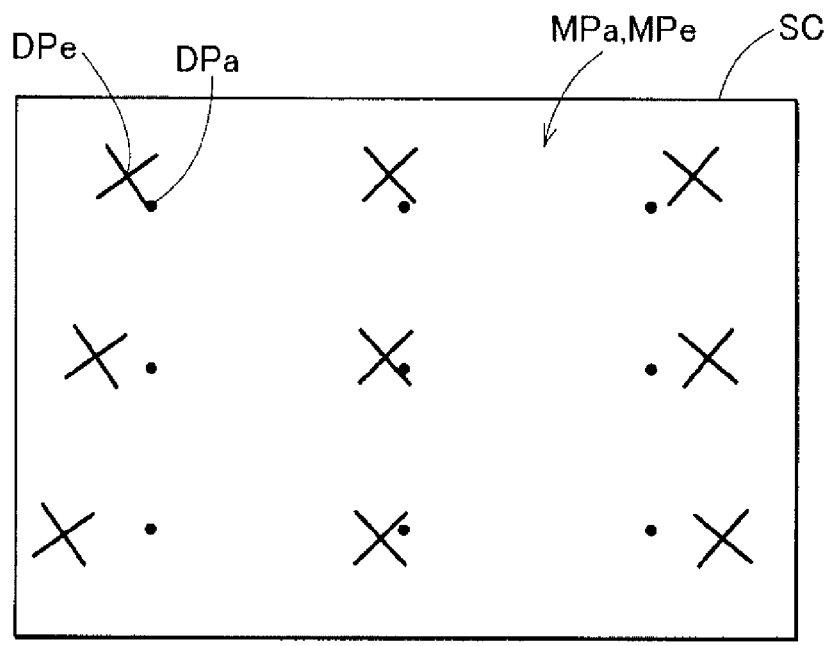

FIGS. 23A to 23C are diagrams schematically illustrating a method for the stack correction according to a modification example. FIG. 23A is a diagram schematically showing the measurement pattern MPa which is projected and displayed by the first projector 100a. The measurement pattern MPa has the same configuration as that of the measurement pattern MPa as described above in the embodiments, and the dot marks which represent the plurality of measurement points DPa are displayed.

FIG. 23B is a diagram schematically showing a measurement pattern MPe which is projected and displayed by the second projector 100b. In the measurement pattern MPe, measurement points DPe are set at the same coordinates as those of the respective measurement points DPa in the measurement pattern MPa, and the measurement points DPe are shown by intersections of straight lines of cross marks (symbols "x"). Although the coordinates of the respective measurement points DPa and DPe are the same in the measurement pattern MPa and the measurement pattern MPe as described above, the shapes of the marks thereof are different.

FIG. 23C is a diagram schematically showing a projection screen SC, on which the measurement patterns MPa and MPe are projected and displayed by the first and second projectors 100a and 100b. In this modification example, the second projector 100b causes the imaging unit 170 to image the projection screen SC, on which the measurement patterns MPa and MPe are projected and displayed, and performs the stack correction based on the captured image.

The pattern analysis unit 132 of the second projector 100b detects the imaged coordinates of the measurement points DPa which are represented by the dot marks and the measurement points DPe which are represented by the cross marks from the captured image. Then, the pattern analysis unit 132 derives the coordinate transform φ based on the imaged coordinates and the panel coordinates of the measurement points DPe and acquires the transformed coordinates which are obtained by transforming the imaged coordinates of the respective measurement points DPa by using the coordinate transform φ. Furthermore, the correction value calculation unit 134 calculates the stack correction value based on a difference between the transformed coordinates of the measurement points DPa and the coordinates of the respective measurement points DPa, which are included in the reference point coordinate information RPI, on the image.

In the above embodiments, the local coordinate transform ψ for each of the plurality of divided image areas is acquired, and the stack correction is performed by using the coordinate transform ψ. On the other hand, the stack correction is performed by using the coordinate transform φ which uniformly transforms the coordinates over the entire image according to this modification example. Even by such a method, it is possible to cause the coordinate systems of the projection images by the first and second projectors 100a and 100b to coincide with each other and implement the stack projection. However, the stack correction by using the local coordinate transform ψ as described above in the embodiments is preferable since it is possible to acquire a precise correction value which reflects the influence of the lens distortion and the like of the projection optical system 125 and to thereby further enhance the image quality of the stack projection.

C3. Modification Example 3

In the image display systems 10 and 10A according to the above embodiments, the first projector 100a continues projection and display of the measurement pattern MPa while the second projector 100b executes the processing for the stack correction (FIGS. 5 and 18). However, the first projector 100a may complete the projection of the measurement pattern MPa before the stack correction by the second projector 100b is completed. The first projector 100a may continue the projection of the measurement pattern MPa at least until the second projector 100b causes the imaging unit 170 to capture the projection image of the first measurement pattern MPa. According to the above embodiments, however, the stack correction is completed by the second projector 100 if the first projector 100a merely continues the projection of the measurement pattern MPa without executing switch processing of the projection image and suspension processing of the projection processing. Therefore, it is possible to more easily execute the stack correction.

C4. Modification Example 4

In the image display systems 10 and 10A according to the above embodiments, the stack projection for overlapping the projection images which are projected by the first and second projectors 100a and 100b on the same image area on the projection screen SC is executed. However, the image display system 10 may align the projection images of the first and second projectors 100a and 100b such that the circumferential edges of the projection image are partially superimposed with each other and the projection images are positioned next to one another in the vertical or horizontal direction, and a display image (so-called a tiling image) may be formed. That is, the image display system 10 may execute the image display processing for displaying the projection images of the first and second projectors 100a and 100b in combination by matching the coordinate systems of the respective projection images.

C5. Modification Example 5

The image display systems 10 and 10A according to the above embodiments execute stack projection for overlapping the projection images of the two projectors 100a and 100b. However, the image display system 10 may be further designed to execute image display processing for combining projection images of a plurality of projectors. In such a case, a first projector 100a and a plurality of second projectors 100b are combined. Then, the other projectors 100b perform correction for matching their own coordinate systems of the projection images with the coordinate system of the projection image of the first projector 100a based on the measurement pattern MPa which is projected by the first projector 100a. With such a configuration, it is possible to realize a more multihued image expression in combination of a plurality of projection images.

C6. Modification Example 6

In the above embodiments, the difference images DI and DIA which are obtained by extracting the measurement patterns MPb and MPd from the captured images CIa and Cid are created in the pattern extraction processing (FIGS. 10 to 11B) in Step S40. However, the pattern extraction processing in Step S40 may be omitted. In such a case, the pattern analysis unit 132 distinguishes and detects the respective measurement patterns MPa, MPb, and MPd, which are configured by different patterns (figures, symbols, designs, hues), from the captured images CIa and CId. Then the pattern analysis unit 132 detects the coordinates of the respective measurement points DPa, DPb, and DPd in the respective measurement patterns MPa, MPb, and MPd, and the stack correction can be thus performed. However, since the images of the respective measurement patterns MPa, MPb, and MPd can be separately acquired by executing the pattern extraction processing as in the above embodiments, error detection of the measurement patterns MPa, MPb, and MPd is suppressed, and it is possible to enhance precision and reliability of the stack correction.

C7. Modification Example 7

In the image display systems 10 and 10A according to the above embodiments, the first and second projectors 100a and 100b project images in a direction facing the image display side (front side) of the projection screen SC. However, the image display system 10 may be configured as a so-called rear projection system which causes the first and second projectors 100a and 100b to project the images from the rear side of the projection screen SC.

C8: Modification Example 8

In the image display systems 10 and 10A according to the above embodiments, the liquid crystal panel 123 is used as an optical modulator which modulates incident light in accordance with the image signal. However, the image display systems 10 and 10A may use a digital mirror device (DMD) as the optical modulator. In addition, the liquid crystal panel 123 may be a reflective liquid crystal panel or a transmissive liquid crystal panel. Furthermore, it is possible to employ any optical modulator without any problem as well as the liquid crystal panel and the DMD as long as the optical modulator can modulate light which is generated by a light source.

C9. Modification Example 9

In the image display systems 10 and 10A according to the above embodiments, the second projector 100b calculates the stack correction value such that the coordinate system of the projection image by the first projector 100a and the coordinate system of its own projection image coincide with each other and performs correction of the image as a projection target. However, the second projector 100b may not perform the correction for matching the coordinate system of the projection image by the first projector 100a and the coordinate system of its own projection image. The second projector 100b may correct the image as the projection target such that the projection image by the first projector 100a and its own projection image are in a predetermined relationship. In the above embodiments, the pattern analysis unit 132 detects the coordinates of the respective measurement points DPa, DPc, and DPd based on the respective detected measurement patterns MPa, MPc, and MPd and derives the coordinate transform ψ. However, the process for detecting the coordinates of the respective measurement points DPa, DPc, and DPd by the pattern analysis unit 132 and the process for acquiring the coordinate transform ψ may be omitted. The second projector 100b may perform the correction such that the projection image by the first projector 100a and its own projection image are in a desired relationship based on the respective measurement patterns MPa, MPc, and MPd which are detected by the pattern analysis unit 132.

C10. Modification Example 10

The invention is not limited to the aforementioned embodiments, examples, and modification examples and can be implemented with various configurations without departing from the gist of the invention. For example, technical features in the embodiments, examples, and modification examples which correspond to the technique features in the respective embodiments described in the summary of the invention can be appropriately replaced or combined in order to partially or entirely solve the aforementioned disadvantages or partially or entirely achieve the aforementioned effects. In addition, the technical features may be appropriately deleted as long as the technical features are not described as essential features in this specification.

What is claimed is:

1. A projector comprising:
a projection unit which projects a projection image of a projection target image on a projection surface;
a projection control unit which causes the projection unit to project a second image when a first image is projected on the projection surface by an other projector, the first image including a first pattern which represents positions of a plurality of measurement patterns, the second image including a second pattern which represents positions of a plurality of measurement points and is different from the first pattern;
an imaging unit which images the projection surface and creates a captured image;
an image analysis unit which detects the first and second patterns from the captured image which is acquired from the imaging unit; and
a correction processing unit which corrects the projection target image such that the projection image projected by the projection unit and the projection image projected by the other projector are in a desired relationship based on a detection result of the image analysis unit.

2. The projector according to claim 1,
wherein the correction processing unit derives a first correspondence relationship between a coordinate system of the captured image and a coordinate system of the projection target image based on coordinates of the plurality of measurement points which are represented by the second pattern in the captured image and coordinates of the plurality of measurement points which are represented by the second pattern in the second image, and corrects the projection target image based on the first correspondence relationship such that the projection image projected by the projection unit and the projection image projected by the other projector are in the desired relationship.

3. The projector according to claim 2,
wherein the correction processing unit derives coordinates in the coordinate system of the projection target image corresponding to coordinates of the plurality of measurement points which are represented by the first pattern in the captured image based on the first correspondence relationship.

4. The projector according to claim 2,
wherein the first pattern represents at least one measurement point for each of a plurality of divided areas which are formed by dividing the first image, and
wherein the second pattern represents at least two or more measurement points for each of the plurality of divided areas in the first image.

5. The projector according to claim 4,
wherein the correction processing unit derives the first correspondence relationship for each of the plurality of divided areas based on the coordinates of the plurality of measurement points which are represented by the second pattern.

6. The projector according to claim 1, further comprising:
a pattern image creating unit which creates the second image based on the captured image including a projection image of the first image.

7. The projector according to claim 6,
wherein the projection control unit causes the projection unit to project a third image when the first image is projected on the projection surface by the other projector, the third image including a third pattern which represents positions of a plurality of measurement points less than the plurality of measurement points in the second image and is different from the first pattern,
wherein the imaging unit images the projection surface on which the first and third images are projected,
wherein the image analysis unit respectively detects the first and third patterns from the captured image which includes projection images of the first and third images, and
wherein the pattern image creating unit derives a second correspondence relationship between a coordinate system of the projection image by the projection unit in the captured image and a coordinate system of the projection target image based on the coordinates of the plurality of measurement points which are represented by the third patterns on the captured image and the coordinates of the plurality of measurement points which are represented by the third pattern in the third image, and forms the second pattern in the second image based on the second correspondence relationship and the coordinates of the plurality of measurement points which are represented by the first pattern in the captured image such that a plurality of measurement points are aligned around each of the plurality of measurement points which are represented by the first pattern on the projection surface.

8. The projector according to claim 4,
wherein the second pattern represents positions of the plurality of measurement points which are dispersed and aligned over the entire second image, and
wherein the correction processing unit extracts measurement points which are present within a predetermined range from respective centers of the plurality of measurement points which are represented by the first pattern among the plurality of measurement points which are represented by the second pattern on the projection surface, and uses the measurement points for deriving the first correspondence relationship.

9. The projector according to claim 1,
wherein the correction processing unit corrects the projection target image such that the projection image projected by the projection unit is substantially superimposed with the projection image which is projected by the other projector.

10. The projector according to claim 1,
wherein the correction processing unit corrects the projection target image such that the projection image which is projected by the projection unit is partially superimposed with the projection image which is projected by the other projector.

11. An image display system which is provided with first and second projectors and causes the first and second projectors to cooperate to form a projection image on a common projection surface,
wherein the first projector includes
a first projection unit which projects a projection image of a projection target image on the projection surface, and
a first projection control unit which causes the first projection unit to project a first image on the projection surface, the first image including a first pattern which represents positions of a plurality of measurement points,
wherein the second projector includes
a second projection unit which projects a projection image of a projection target image on the projection surface,
a second projection control unit which causes the second projection unit to project a second image when the first image is projected on the projection surface by the first projector, the second image including a second pattern which represents positions of a plurality of measurement points and is different from the first pattern,
an imaging unit which images the projection surface and creates a captured image,
an image analysis unit which respectively detects the first and second patterns from the captured image which is acquired from the imaging unit, and
a correction processing unit which corrects the projection target image such that a projection image which is projected by the second projection unit and a projection image which is projected by the first projection unit are in a desired relationship based on a detection result of the image analysis unit.

12. The image display system according to claim 11,
wherein the first projection control unit of the first projector continues the projection of the first image until the correction processing unit starts the correction of the projection target image after the second projection control unit of the second projector starts the projection of the second image.

13. A control method of a projector comprising:
(a) projecting a projection image of a projection target image on a projection surface with the projector;
(b) projecting a second image on a the projection surface with the projector when a first image is projected on the projection surface by an other projector, the first image including a first pattern which represents positions of a plurality of measurement points, the second image including a second pattern which represents positions of a plurality of measurement points and is different from the first pattern;
(c) imaging the projection surface, on which the first and second patterns are projected and displayed;
(d) respectively detecting the first and second patterns from a captured image of the projection surface; and
(e) correcting the projection target image based on a detection result of the first and second patterns such that a projection image which is projected by the projector and an image which is projected by the other projector are in a desired relationship.

* * * * *